US009262520B2

(12) United States Patent
Sweeney et al.

(10) Patent No.: US 9,262,520 B2
(45) Date of Patent: *Feb. 16, 2016

(54) SYSTEM, METHOD AND COMPUTER PROGRAM FOR CREATING AND MANIPULATING DATA STRUCTURES USING AN INTERACTIVE GRAPHICAL INTERFACE

(75) Inventors: Peter Joseph Sweeney, Kitchener (CA); David Goodwin, Kitchener (CA); David Janik-Jones, Waterloo (CA)

(73) Assignee: Primal Fusion Inc., Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/105,890

(22) Filed: May 11, 2011

(65) Prior Publication Data
US 2011/0282919 A1 Nov. 17, 2011

Related U.S. Application Data

(63) Continuation-in-part of application No. 12/615,703, filed on Nov. 10, 2009, now Pat. No. 8,281,238.

(51) Int. Cl.
*G06F 3/048* (2013.01)
*G06F 17/30* (2006.01)

(52) U.S. Cl.
CPC .... *G06F 17/30716* (2013.01); *G06F 17/30365* (2013.01)

(58) Field of Classification Search
CPC ............ G06F 17/30991; G06F 3/0481; G06F 17/30867; G06F 3/048; G06F 3/04817; G06F 17/2785; G06F 17/30259; G06T 11/206; G06K 9/6253; Y10S 707/99943; G01S 5/0294; G01S 5/12; H04W 4/04
See application file for complete search history.

(56) References Cited

U.S. PATENT DOCUMENTS 3,943,462 A    3/1976   Thompson
4,532,813 A    8/1985   Rinehart
(Continued)

FOREIGN PATENT DOCUMENTS

CA    2734756 A1    3/2010
CN    1395193 A    2/2003
(Continued)

OTHER PUBLICATIONS

International search report and written opinion for International application No. PCT/CA2010/001772, dated Apr. 28, 2011.
(Continued)

*Primary Examiner* — Boris Pesin
*Assistant Examiner* — Ayesha Huertas Torres
(74) *Attorney, Agent, or Firm* — Wolf, Greenfield & Sacks, P.C.

(57) ABSTRACT

A computer network-implemented method for displaying a tag cloud representing a data structure. The data structure includes data entities and representations of relationships between the data entities. The method enables one or more users to interact with the data structure, and via the data structure, to interact with one another. In an example embodiment, the method comprises, via a computer processor, populating a display of a user interface showing a tag cloud populated with images of data entities from the data structure, such images, and in response to user input to the interface, associating one or more visual properties of the user interface with one or more of said relationships between data entities in the data structure.

34 Claims, 22 Drawing Sheets

REPOSITIONING THOUGHTS

(56) References Cited

U.S. PATENT DOCUMENTS

| | | |
|---|---|---|
| 4,972,328 A | 11/1990 | Wu et al. |
| 5,056,021 A | 10/1991 | Ausborn |
| 5,193,185 A | 3/1993 | Lanter |
| 5,369,763 A | 11/1994 | Biles |
| 5,745,910 A | 4/1998 | Piersol et al. |
| 5,793,376 A | 8/1998 | Tanaka et al. |
| 5,835,758 A | 11/1998 | Nochur et al. |
| 5,911,145 A | 6/1999 | Arora et al. |
| 5,937,400 A | 8/1999 | Au |
| 5,953,726 A | 9/1999 | Carter et al. |
| 6,006,222 A | 12/1999 | Culliss |
| 6,078,916 A | 6/2000 | Culliss |
| 6,098,033 A | 8/2000 | Richardson et al. |
| 6,138,085 A | 10/2000 | Richardson et al. |
| 6,167,390 A | 12/2000 | Brady et al. |
| 6,173,276 B1 | 1/2001 | Kant et al. |
| 6,233,575 B1 | 5/2001 | Agrawal et al. |
| 6,292,792 B1 | 9/2001 | Baffes et al. |
| 6,295,066 B1 | 9/2001 | Tanizaki et al. |
| 6,334,131 B2 | 12/2001 | Chakrabarti et al. |
| 6,349,275 B1 | 2/2002 | Schumacher et al. |
| 6,356,899 B1 | 3/2002 | Chakrabarti et al. |
| 6,396,864 B1 | 5/2002 | O'Brien et al. |
| 6,401,061 B1 | 6/2002 | Zieman |
| 6,499,024 B1 | 12/2002 | Stier et al. |
| 6,539,376 B1 | 3/2003 | Sundaresan et al. |
| 6,539,395 B1 | 3/2003 | Gjerdingen et al. |
| 6,556,983 B1 | 4/2003 | Altschuler et al. |
| 6,571,240 B1 | 5/2003 | Ho et al. |
| 6,694,329 B2 | 2/2004 | Murray |
| 6,751,611 B2 | 6/2004 | Krupin et al. |
| 6,751,621 B1 | 6/2004 | Calistri-Yeh et al. |
| 6,768,982 B1 | 7/2004 | Collins et al. |
| 6,772,136 B2 | 8/2004 | Kant et al. |
| 6,785,683 B1 | 8/2004 | Zodik et al. |
| 6,868,525 B1 | 3/2005 | Szabo |
| 6,976,020 B2 | 12/2005 | Anthony et al. |
| 6,980,984 B1 | 12/2005 | Huffman et al. |
| 7,007,074 B2 | 2/2006 | Radwin |
| 7,035,864 B1 | 4/2006 | Ferrari et al. |
| 7,051,023 B2 | 5/2006 | Kapur et al. |
| 7,062,466 B2 | 6/2006 | Wagner et al. |
| 7,062,483 B2 | 6/2006 | Ferrari et al. |
| 7,089,237 B2 | 8/2006 | Turnbull et al. |
| 7,120,646 B2 | 10/2006 | Streepy, Jr. |
| 7,152,065 B2 | 12/2006 | Behrens et al. |
| 7,181,465 B2 | 2/2007 | Maze et al. |
| 7,209,922 B2 | 4/2007 | Maze et al. |
| 7,225,183 B2 | 5/2007 | Gardner |
| 7,249,117 B2 | 7/2007 | Estes |
| 7,280,991 B1 | 10/2007 | Beams et al. |
| 7,283,992 B2 | 10/2007 | Liu et al. |
| 7,302,418 B2 | 11/2007 | Asahara |
| 7,319,951 B2 | 1/2008 | Rising, III et al. |
| 7,392,250 B1 | 6/2008 | Dash et al. |
| 7,406,456 B2 | 7/2008 | Calistri-Yeh et al. |
| 7,418,452 B2 | 8/2008 | Maze |
| 7,440,940 B2 | 10/2008 | Chen et al. |
| 7,478,089 B2 | 1/2009 | Henkin et al. |
| 7,490,073 B1 | 2/2009 | Qureshi et al. |
| 7,493,319 B1 | 2/2009 | Dash et al. |
| 7,496,593 B2 | 2/2009 | Gardner et al. |
| 7,502,810 B2 | 3/2009 | Acevedo-Aviles et al. |
| 7,580,918 B2 | 8/2009 | Chang et al. |
| 7,596,374 B2 | 9/2009 | Katou |
| 7,596,574 B2 | 9/2009 | Sweeney |
| 7,606,168 B2 | 10/2009 | Robinson et al. |
| 7,606,781 B2 | 10/2009 | Sweeney et al. |
| 7,627,582 B1 | 12/2009 | Ershov |
| 7,668,737 B2 | 2/2010 | Streepy, Jr. |
| 7,711,672 B2 | 5/2010 | Au |
| 7,716,207 B2 | 5/2010 | Odom et al. |
| 7,716,216 B1 | 5/2010 | Harik et al. |
| 7,720,857 B2 | 5/2010 | Beringer et al. |
| 7,752,199 B2 | 7/2010 | Farrell |
| 7,752,534 B2 | 7/2010 | Blanchard, III et al. |
| 7,827,125 B1 | 11/2010 | Rennison |
| 7,844,565 B2 | 11/2010 | Sweeney |
| 7,849,090 B2 | 12/2010 | Sweeney |
| 7,860,817 B2 | 12/2010 | Sweeney et al. |
| 7,945,555 B2 | 5/2011 | Sankaran et al. |
| 7,970,764 B1 * | 6/2011 | Ershov .................. 707/736 |
| 8,010,570 B2 | 8/2011 | Sweeney |
| 8,281,238 B2 | 10/2012 | Sweeney et al. |
| 2002/0069197 A1 | 6/2002 | Katayama et al. |
| 2002/0078044 A1 | 6/2002 | Song et al. |
| 2002/0133483 A1 | 9/2002 | Klenk et al. |
| 2002/0194187 A1 | 12/2002 | McNeil et al. |
| 2003/0177112 A1 | 9/2003 | Gardner |
| 2003/0196094 A1 | 10/2003 | Hillis et al. |
| 2003/0217023 A1 | 11/2003 | Cui et al. |
| 2003/0217335 A1 | 11/2003 | Chung et al. |
| 2004/0024739 A1 | 2/2004 | Copperman et al. |
| 2004/0049522 A1 | 3/2004 | Streepy, Jr. |
| 2005/0010428 A1 | 1/2005 | Bergeron et al. |
| 2005/0065955 A1 | 3/2005 | Babikov et al. |
| 2005/0086188 A1 | 4/2005 | Hillis et al. |
| 2005/0149518 A1 | 7/2005 | Duan et al. |
| 2005/0154708 A1 | 7/2005 | Sun |
| 2005/0209874 A1 | 9/2005 | Rossini |
| 2005/0216335 A1 | 9/2005 | Fikes et al. |
| 2005/0223109 A1 | 10/2005 | Mamou et al. |
| 2005/0289524 A1 * | 12/2005 | McGinnes .................. 717/140 |
| 2006/0010117 A1 | 1/2006 | Bonabeau et al. |
| 2006/0026147 A1 | 2/2006 | Cone et al. |
| 2006/0053172 A1 | 3/2006 | Gardner et al. |
| 2006/0074980 A1 | 4/2006 | Sarkar |
| 2006/0085489 A1 | 4/2006 | Tomic et al. |
| 2006/0129906 A1 | 6/2006 | Wall |
| 2006/0153083 A1 | 7/2006 | Wallenius |
| 2006/0195407 A1 | 8/2006 | Athelogou et al. |
| 2006/0242564 A1 | 10/2006 | Egger et al. |
| 2006/0271520 A1 | 11/2006 | Ragan |
| 2007/0033531 A1 | 2/2007 | Marsh |
| 2007/0036440 A1 | 2/2007 | Schaepe et al. |
| 2007/0038500 A1 | 2/2007 | Hammitt et al. |
| 2007/0061195 A1 | 3/2007 | Liu et al. |
| 2007/0078889 A1 | 4/2007 | Hoskinson |
| 2007/0083492 A1 | 4/2007 | Hohimer et al. |
| 2007/0094221 A1 | 4/2007 | Au |
| 2007/0106658 A1 | 5/2007 | Ferrari et al. |
| 2007/0118542 A1 | 5/2007 | Sweeney |
| 2007/0136221 A1 | 6/2007 | Sweeney et al. |
| 2007/0143300 A1 | 6/2007 | Gulli et al. |
| 2007/0174041 A1 | 7/2007 | Yeske |
| 2007/0192272 A1 | 8/2007 | Elfayoumy et al. |
| 2007/0203865 A1 | 8/2007 | Hirsch |
| 2007/0208719 A1 | 9/2007 | Tran |
| 2007/0208764 A1 | 9/2007 | Grisinger |
| 2007/0288503 A1 | 12/2007 | Taylor |
| 2007/0294200 A1 | 12/2007 | Au |
| 2007/0300142 A1 | 12/2007 | King et al. |
| 2008/0001948 A1 | 1/2008 | Hirsch |
| 2008/0004864 A1 | 1/2008 | Gabrilovich et al. |
| 2008/0021925 A1 | 1/2008 | Sweeney |
| 2008/0072145 A1 | 3/2008 | Blanchard et al. |
| 2008/0086465 A1 | 4/2008 | Fontenot et al. |
| 2008/0092044 A1 | 4/2008 | Lewis et al. |
| 2008/0126303 A1 | 5/2008 | Park et al. |
| 2008/0137668 A1 | 6/2008 | Rodriguez et al. |
| 2008/0154906 A1 | 6/2008 | McDavid et al. |
| 2008/0162498 A1 | 7/2008 | Omoigui |
| 2008/0228568 A1 | 9/2008 | Williams et al. |
| 2008/0243480 A1 | 10/2008 | Bartz et al. |
| 2008/0270120 A1 | 10/2008 | Pestian et al. |
| 2008/0275694 A1 | 11/2008 | Varone |
| 2008/0281814 A1 | 11/2008 | Calistri-Yeh et al. |
| 2008/0294584 A1 | 11/2008 | Herz |
| 2009/0012842 A1 | 1/2009 | Srinivasan et al. |
| 2009/0018988 A1 | 1/2009 | Abrams et al. |
| 2009/0024385 A1 | 1/2009 | Hirsch |
| 2009/0024556 A1 | 1/2009 | Hirsch |
| 2009/0028164 A1 | 1/2009 | Hirsch |
| 2009/0055342 A1 | 2/2009 | Gong et al. |

(56) References Cited

U.S. PATENT DOCUMENTS

| | | |
|---|---|---|
| 2009/0070219 A1 | 3/2009 | D'Angelo et al. |
| 2009/0083140 A1 | 3/2009 | Phan |
| 2009/0106234 A1 | 4/2009 | Siedlecki et al. |
| 2009/0138454 A1 | 5/2009 | Rayner et al. |
| 2009/0144059 A1 | 6/2009 | Yu et al. |
| 2009/0150809 A1 | 6/2009 | Hirsch |
| 2009/0157442 A1 | 6/2009 | Tesler |
| 2009/0157616 A1 | 6/2009 | Barber et al. |
| 2009/0182725 A1 | 7/2009 | Govani et al. |
| 2009/0192954 A1 | 7/2009 | Katukuri et al. |
| 2009/0192968 A1 | 7/2009 | Tunstall-Pedoe |
| 2009/0198561 A1 | 8/2009 | Otto et al. |
| 2009/0228425 A1 | 9/2009 | Goraya |
| 2009/0300326 A1 | 12/2009 | Sweeney |
| 2009/0307581 A1 | 12/2009 | Jaepel et al. |
| 2009/0327205 A1 | 12/2009 | Sweeney |
| 2009/0327417 A1 | 12/2009 | Chakra et al. |
| 2010/0030552 A1 | 2/2010 | Chen et al. |
| 2010/0036783 A1 | 2/2010 | Rodriguez |
| 2010/0036790 A1 | 2/2010 | Sweeney et al. |
| 2010/0036829 A1 | 2/2010 | Leyba |
| 2010/0049702 A1 | 2/2010 | Martinez et al. |
| 2010/0049766 A1 | 2/2010 | Sweeney et al. |
| 2010/0057664 A1 | 3/2010 | Sweeney et al. |
| 2010/0070448 A1 | 3/2010 | Omoigui |
| 2010/0100546 A1 | 4/2010 | Kohler |
| 2010/0107094 A1 | 4/2010 | Steelberg et al. |
| 2010/0122151 A1 | 5/2010 | Mendelson et al. |
| 2010/0153219 A1 | 6/2010 | Mei et al. |
| 2010/0161317 A1 | 6/2010 | Au |
| 2010/0198724 A1 | 8/2010 | Thomas |
| 2010/0205061 A1 | 8/2010 | Karmarkar |
| 2010/0217745 A1 | 8/2010 | Song et al. |
| 2010/0223295 A1 | 9/2010 | Stanley et al. |
| 2010/0228693 A1 | 9/2010 | Dawson et al. |
| 2010/0235307 A1 | 9/2010 | Sweeney et al. |
| 2010/0250526 A1 | 9/2010 | Prochazka et al. |
| 2010/0257171 A1 | 10/2010 | Shekhawat |
| 2010/0262456 A1 | 10/2010 | Feng et al. |
| 2010/0268596 A1 | 10/2010 | Wissner et al. |
| 2010/0280860 A1 | 11/2010 | Iskold et al. |
| 2010/0285818 A1 | 11/2010 | Crawford |
| 2010/0287011 A1 | 11/2010 | Muchkaev |
| 2011/0040749 A1 | 2/2011 | Ceri et al. |
| 2011/0060644 A1 | 3/2011 | Sweeney |
| 2011/0060645 A1 | 3/2011 | Sweeney |
| 2011/0060794 A1 | 3/2011 | Sweeney |
| 2011/0113386 A1 | 5/2011 | Sweeney et al. |
| 2011/0173176 A1 | 7/2011 | Christensen et al. |
| 2011/0282919 A1 | 11/2011 | Sweeney et al. |
| 2011/0314006 A1 | 12/2011 | Sweeney et al. |
| 2011/0314382 A1 | 12/2011 | Sweeney |
| 2011/0320396 A1 | 12/2011 | Hunt et al. |
| 2012/0143880 A1 | 6/2012 | Sweeney et al. |
| 2012/0150874 A1 | 6/2012 | Sweeney et al. |
| 2012/0166371 A1 | 6/2012 | Sweeney et al. |
| 2012/0166372 A1 | 6/2012 | Ilyas et al. |
| 2012/0166373 A1 | 6/2012 | Sweeney et al. |

FOREIGN PATENT DOCUMENTS

| | | |
|---|---|---|
| EP | 0 962 873 A1 | 12/1999 |
| JP | 2005-316699 A | 11/2005 |
| WO | WO 02/054292 A2 | 7/2002 |
| WO | WO 2004/075466 A2 | 9/2004 |
| WO | WO 2005/020093 A1 | 3/2005 |
| WO | WO 2005/020094 A1 | 3/2005 |
| WO | WO 2007/047971 A2 | 4/2007 |
| WO | WO 2008/025167 A1 | 3/2008 |
| WO | WO 2008/076438 A1 | 6/2008 |
| WO | WO 2008076438 A1 * | 6/2008 |
| WO | WO 2009/014837 A2 | 1/2009 |
| WO | WO 2009/132442 A1 | 11/2009 |
| WO | WO 2010/022505 A1 | 3/2010 |
| WO | WO 2010/149427 A1 | 12/2010 |
| WO | WO 2011/029177 A1 | 3/2011 |
| WO | WO 2011/029177 A4 | 3/2011 |
| WO | WO 2011/057396 A1 | 5/2011 |
| WO | WO 2011/160204 A1 | 12/2011 |
| WO | WO 2011/160205 A1 | 12/2011 |
| WO | WO 2011/160214 A1 | 12/2011 |
| WO | WO 2012/088590 A1 | 7/2012 |
| WO | WO 2012/088591 A1 | 7/2012 |
| WO | WO 2012/088611 A1 | 7/2012 |
| WO | WO 2012/092669 A1 | 7/2012 |

OTHER PUBLICATIONS

Y. Hassan-Montero, V. Herrero-Solana, Improving tag-clouds as visual information retrieval interfaces, International Conference on Multidisciplinary Information Sciences and Technologies, InSciT2006. Oct. 25-28, 2006, Merida, Spain.
Owen Kaser, Daniel Lemire, Tag-Cloud Drawing: Algorithms for Cloud Visualization, arXiv:cs/0703109v2 [cs.DS] May 7, 2007.
Office Action from U.S. Appl. No. 12/615,703 dated Feb. 1, 2012.
Chinese Office Action for Chinese Application No. 200780032062.9, Issued May 17, 2011.
International Search Report and Written Opinion for PCT/CA2007/001546 dated Dec. 28, 2007.
International Preliminary Report on Patentability for PCT/CA2007/001546 dated Dec. 19, 2008.
International Search Report and Written Opinion for PCT/CA2009/000567 mailed Aug. 24, 2009.
International Preliminary Report on Patentability for PCT/CA2009/000567 mailed Nov. 11, 2010.
International Search Report and Written Opinion for PCT/CA2009/001185 mailed Dec. 3, 2009.
International Preliminary Report on Patentability for PCT/CA2009/001185 mailed Mar. 10, 2011.
International Search Report and Written Opinion for PCT/CA2010/001382 mailed Jan. 13, 2011.
International Preliminary Report on Patentability for PCT/CA2010/001382 mailed Mar. 22, 2012.
International Search Report and Written Opinion for PCT/CA2010/001772 dated Apr. 28, 2011.
International Preliminary Report on Patentability for PCT/CA2010/001772 dated May 24, 2012.
International Search Report and Written Opinion for PCT/CA2011/000718 mailed Oct. 13, 2011.
International Search Report and Written Opinion for PCT/CA2011/000719 mailed Sep. 28, 2011.
International Search Report and Written Opinion for PCT/CA2011/000745 mailed Sep. 22, 2011.
International Search Report and Written Opinion for PCT/CA2011/001382 mailed Apr. 24, 2012.
International Search Report and Written Opinion for PCT/CA2011/001402, mailed Apr. 24, 2012.
International Search Report and Written Opinion for PCT/CA2011/001403 mailed May 23, 2012.
International Search Report and Written Opinion for PCT/CA2012/000007 mailed Apr. 20, 2012.
International Search Report and Written Opinion for PCT/CA2012/000009 mailed May 1, 2012.
Office Action for U.S. Appl. No. 11/625,452 mailed Mar. 30, 2009.
Office Action for U.S. Appl. No. 11/625,452 mailed Dec. 7, 2009.
Office Action for U.S. Appl. No. 11/625,452 mailed Mar. 26, 2010.
Office Action for U.S. Appl. No. 12/477,994 mailed Aug. 31, 2010.
Office Action for U.S. Appl. No. 12/477,977 mailed Sep. 28, 2010.
Office Action for U.S. Appl. No. 11/469,258 mailed Aug. 21, 2008.
Interview Summary for U.S. Appl. No. 11/469,258 mailed Dec. 16, 2008.
Office Action for U.S. Appl. No. 11/550,457 mailed Dec. 15, 2008.
Office Action for U.S. Appl. No. 12/556,349 mailed Jun. 29, 2010.
Office Action for U.S. Appl. No. 12/441,100 mailed Jun. 9, 2011.
Office Action for U.S. Appl. No. 12/441,100 mailed Jan. 24, 2012.
Advisory Action for U.S. Appl. No. 12/441,100 mailed May 4, 2012.
Office Action for U.S. Appl. No. 12/549,812 mailed Oct. 1, 2012.
Office Action for U.S. Appl. No. 12/555,222 nailed Jan. 27, 2012.

(56) References Cited

OTHER PUBLICATIONS

Office Action for U.S. Appl. No. 12/555,222 mailed Oct. 31, 2012.
Office Action for U.S. Appl. No. 12/555,341 mailed Feb. 9, 2012.
Office Action for U.S. Appl. No. 12/555,341 mailed Aug. 1, 2012.
Office Action for U.S. Appl. No. 12/615,703 mailed Feb. 1, 2012.
Office Action for U.S. Appl. No. 13/105,890 mailed Jun. 26, 2012.
[No Author Listed] "Faceted Classification and Adaptive Concept Matching," Gemstone Business Intelligence Ltd., Feb. 2006. pp. 1-7. 7 pages.
Anick et al., Interactive document retrieval using faceted terminological feedback. HICSS-32. Proceedings of the 32nd Annual Hawaii International Conference on Systems Sciences. 1999;2(2):2036-2048. Digital Object Identifier: 10.1109/HICSS.1999.772692.
Blei et al., Hierarchical bayesian models for applications in information retrieval. In: Bayesian Statistics 7. Bernardo et al., eds. 2003:25-43.
Bollegala et al., Measuring semantic similarity between words using web searches engines. Proceedings of 16th International Conference on World Wide Web. 2007;757-66.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:12 pages.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:203-207. 5 pages.
Dakka et al., Automatic Extraction of Useful Facet Hierarchies from Text Databases. Data Engineering. IEEE 24th International Conference on Apr. 7-12, 2008. ICDE 2008:466-475. Digital Object Identifier 10.1109/ICDE.2008.4467455.
Fikadu et al., A Framework for Personalized Information Retrieval Model. Conference Proceedings, Second International Conference on Computer and Network Technology (ICCNT), IEEE, Piscataway, NJ, USA Apr. 23, 2010, pp. 500-505.
Gabrilovich et al., Computing semantic relatedness using wikipedia-based explicit semantic analysis. Proceedings of 20th International Joint Conference on Artificial Intelligence. 2007;1606-11.
Hassan-Montero et al., Improving tag-clouds as visual information retrieval interfaces, International Conference on Multidisciplinary Information Sciences and Technologies, InSciT2006. Oct. 25-28, 2006, Merida, Spain. 6 pages.
Hiemstra, A probabilisitc justification for using tf-idf term weighting in information retrieval. International Journal on Digital Libraries. 2000;3(2):131-39.
Jiang et al., Semantic similarity based on corpus statistics and lexical taxonomy. Proceedings of International Conference Research on Computational Linguistics. 1997; 15 pages.
Jones, A statistical interpretation of term specificity and its applications in retrieval. Journal of Documentation. 2004;60(5):493-502.
Kaser et al., Tag-Cloud Drawing: Algorithms for Cloud Visualization, arXiv:cs/0703109v2 [cs.DS] May 7, 2007.
Lewis, Naive (bayes) at forty: The independence assumption in information retrieval. Lecture Notes in Computer Science. 1998;1398:4-15.

Ma et al., Semantic Information Extraction of Video Based on Ontology and Inference. ICSC 2007. International Conference on Semantic Computing. 2007;1:721-726. Digital Object Identifier: 10.1109/ICSC.2007.12.
Metzler et al., A markov random field model for term dependencies. Proceedings of SIGIR 2005. 2005:472-79.
Ozcan et al., Concept-based information access. Proceedings of the International Conference on Information Technology: Coding and Computing. ITCC 2005;1:794-799. Digital Object Identifier: 10.1109/ITCC.2005.111.
Payne et al., Calendar Agents on the Semantic Web. IEEE Intelligent Systems. Jun. 2002;17(3):84-86.
Robertson, Understanding inverse document frequency: On theoretical arguments for ids. Journal of Documentation. 2004;60(5):503-20.
Rocha, Adaptive Webs for Heterarchies with Diverse Communities of Users. Paper prepared for the workshop from Intelligent Networks to the Global Brain: Evolutionary Social Organization through Knowledge Technology, Brussels, Jul. 3-5, 2001. LAUR005173. 35 pages.
Seco et al., An intrinsic information content metric for semantic similarity in wordnet. Proceedings of 16th European Conference on Artifical Intelligence. 2004;1089-90.
Slavic et al., Core Requirements for Automation of Analytico-Synthetic Classifications. Advances in Knowledge Organization. 2004;9:187-192.
Song et al., A conceptual graph approach to semantic similarity computation method for e-service discovery. International Journal on Knowledge Engineering and Data Mining. 2010;1(1):50-68.
Storey, Comparing Relationships in Conceptual Modeling: Mapping to Semantic Classifications. IEEE Transactions on Knowledge and Data Engineering. 2005;17(11):1478-1489. Digital Object Identifier: 10.1109/.
Terra et al., Frequency estimates for statistical word similarity measures. Proceedings of 2003 Conference of the North American Chapter of the Association for Computational Linguistics on Human Language Technology. 2003:165-172.
Wang et al., Gene expression correlation and gene ontology-based similarity: An assesment of quantitative relationships. Proceedings of IEEE Symposium on Computational Intelligence in Bioinformatics and Computational Biology. 2004:25-31.
Wu et al., Interpreting tf-idf term weights as making relevance decisions. ACM Transactions on Information Systems. 2008;26(3):Article No. 13.
Zhai, Statistical language models for information retrieval—a critical review. Foundations and Trends in Information Retrieval. 2008;2(3):137-213.
Zhang et al., Bootstrapping Ontology Learning for Information Retrieval Using Formal Concept Analysis and Information Anchors. 14th International Conference on Conceptual Structures. Aalborg, Denmark. Jul. 2006. 14 pages.
Office Communication for Chinese Application No. 201080055700.0 dated Oct. 8, 2014.
Office Communication for Japanese Application No. 2012-538155 dated Oct. 29, 2013.
Office Communication for Japanese Application No. 2012-538155 dated Jun. 24, 2014.

\* cited by examiner

OVERVIEW

INSERTING A NEW THOUGHT

INSERTING A NEW THOUGHT

INSERTING A NEW THOUGHT

RESIZING FONTS

RESIZING FONTS

RESIZING FONTS

REPOSITIONING THOUGHTS

REPOSITIONING THOUGHTS

REPOSITIONING THOUGHTS

ADDING DATA TO THOUGHTS

ADDING DATA TO THOUGHTS

SUGGESTED RELATED THOUGHTS

SUGGESTED RELATED THOUGHTS

HIERARCHY

Completed knowledge network concepts stored at both global and local scales. Global scale can be a shared, collaborative space.

SYSTEM, METHOD AND COMPUTER PROGRAM FOR CREATING AND MANIPULATING DATA STRUCTURES USING AN INTERACTIVE GRAPHICAL INTERFACE

RELATED APPLICATIONS

This application is a continuation-in-part and claims the benefit under 35 U.S.C. §120 of U.S. patent application Ser. No. 12/615,703, filed 10 Nov. 2009 now U.S. Pat. No. 8,281, 238, and titled System, Method And Computer Program For Creating And Manipulating Data Structures Using An Interactive Graphical Interface, now pending.

FIELD OF THE INVENTION

The invention relates generally to an interface for creating and manipulating data structures. Aspects of the invention relate more specifically to a system, method and computer program product for creating, visualizing and manipulating (e.g., inputting to or changing) a data structure using an intuitive and interactive graphical interface.

BACKGROUND OF THE INVENTION

Knowledge can be represented using various types of data structures, including graphs. One such graph is known as a semantic network. A semantic network is a directed graph consisting of vertices, which represent concepts, and edges, which represent semantic relations between the concepts.

A semantic network can become unwieldy as it grows.

Tags can be used to represent concepts in the semantic network. Sets of tags, in a visualization known as "tag clouds", can be used to represent relationships between concepts. Tag clouds are a familiar data visualization device on the Internet. Tag clouds are commonly used to represent tags in a meaningful way, for example to describe to a user the prevalence of tags in blogs and other Internet resources. Properties of words, such as size, weight or colour, may represent properties of the underlying data. A tag cloud may be generated either manually or using computerized means.

FIGS. 1A to 1C illustrate examples of tag clouds. As shown in FIG. 1A, for example, a cloud may comprise several differently sized tags wherein larger tags in the cloud represent a greater (e.g., higher volume) use of the tag in a blog. As shown in FIGS. 1B and 1C, for example, the sizes of the tags may signify the importance of concepts relative to a context, importance being determined by a measure such as frequency of occurrence.

Information may be encoded in tag properties (such as size, weight or colour) but absolute and relative position is virtually meaningless in a tag cloud. The tags are typically single words, which may be ordered alphabetically or otherwise. The words may be aligned on a baseline or arranged in some other way, but this is typically done to conserve space or to obtain different visual effects.

However, these tag clouds are not interactive as they merely represent information graphically without any means for feedback from a user. With a tag cloud there is no means to manipulate the relationships between the tags.

The prior art does not discuss ways in which to present a simple visual representation of a hierarchical or polyhierarchical data structure (such as a taxonomy of terms or a semantic network) so as to enable the average computer user to create, visualize or manipulate the data structure. While manual entry of new concepts and relationships has been contemplated to a limited extent in the prior art, what has not been disclosed in the prior art is the use of a tag cloud to create (i.e., record) concepts and automatically infer relationships to existing concepts represented by the tags. What has also not been disclosed is a convenient way in which to visualize and manipulate relationships between the concepts represented by the tags. In other words, the prior art does not teach using the tag cloud as an input device to create and alter the represented semantic network or other data structure.

U.S. patent application Ser. No. 11/548,894 to Lewis et al. discloses a tag cloud that is presented to a user where each tag can lead to n-layers of relevant information.

U.S. patent application Ser. No. 11/540,628 to Hoskinson discloses a tag cloud that is computer generated in response to a search query. The tags, containing subject representation or labels, are linked to associated websites from where the information for generating the cloud is initially collected.

U.S. patent application Ser. No. 11/533,058 to Blanchard et al. discloses customizing a display of a presented tag cloud. These clouds are customizable in terms of their attributes such as font color, font size, borders, 3D-depth, shadowing, and so on. While changes in all these attributes contribute to visual display of the tags in the tag cloud, there is no corresponding material affect on the information represented by the tag cloud.

None of the above applications discuss ways in which to present a data structure to a user so as to visually represent relationships that may exist between concepts represented by the tags and enable the manipulation of the data structure by the user using the tags.

PCT/US2007/025873 to Lindermann, et al. discloses enabling a user to input, store and output in a graphical user interface concepts expressed as a word or combination of words and relationships between these concepts. The user provides the concepts to a thought engine and specifies the type or nature of relationship between concepts. A user builds and shares the generated semantic network.

Lindermann et al. is directed to enabling users that do not understand structured data to insert the data into the structure. The user inserts the data and the relationships explicitly and, therefore, must learn how the relationships are made. There is no automation provided for establishing relationships based on ways in which the user views the data. While Lindermann et al. discuss a user classifying the types of new relationships, there is no discussion of simple ways in which to establish the relationship with minimal user input. There is also no discussion at all of ways in which to easily manipulate existing relationships between concepts in a semantic network.

Therefore, what is required is a means and method by which to enable the average computer user to create, visualize or manipulate a data structure (particularly a hierarchical, polyhierarchical, associative or equivalence) data structure, using a tag cloud.

Also lacking heretofore is a way for users to interact with each other so that a community can create, visualize and/or manipulate such a data structure using a tag cloud, especially in a way that tracks changes made to the data structure over time, who made each change and when the change was made. A means and method which allows such user interaction would be very useful.

SUMMARY

A user interface is described for use in a computer network implemented method and apparatus for displaying a data structure and enabling one or more users to interact with the data structure by means of the user interface, the data structure including data entities and relationships between the data entities. One or more user context properties are associable with the data entities such that, for example, the data structure may be reflective of a user context. In this regard, the user context may, but will not necessarily, result in relationships between data entities being hierarchical, polyhierarchical, associative or equivalence relationships. The method comprises: populating the user interface with data entities from the data structure by enabling the one or more users to associate one or more visual properties of the user interface with the user context associable properties of the data structure, thereby enabling the one or more users to interact with the data structure by means of the user interface, using one or more computer processors.

The data entities are displayed by means of the user interface, enabling one or more users to interact with the data structure. The user interface enables a user to define the relationships between new and existing data entities without having to understand the nature of the relationships in the underlying data structure and without explicitly specifying the desired changes to the relationships.

Some embodiments discussed herein also provide a system configured to execute a computer-implemented method for displaying a data structure including data entities and relationships between the data entities, wherein one or more user context properties are associable with the data entities, and enabling one or more users to interact with the data structure including by creating the data structure and/or editing the data structure, the system comprising one or more computer devices including or being linked to: (a) at least one display, and (b) a user interface utility operable to: (i) present to one or more users a user interface, by means of the at least one display; and (b) populate the user interface with data entities from the data structure by enabling the one or more users to associate one or more visual properties of the user interface with the user context associable properties of the data structure, thereby enabling the one or more users to interact with the data structure by means of the user interface.

Some embodiments further provide a computer program product containing executable computer program instructions which, when executed by one or more computers having a display, presents a user interface corresponding to a data structure and enables one or more users to interact with the data structure including by creating the data structure, the data structure including data entities and relationships between the data entities, wherein one or more user context properties are associable with the data entities, the interaction with the data structure on a user interface including: populating the user interface with data entities from the data structure by enabling the one or more users to associate one or more visual properties of the user interface with the user context associable properties of the data structure, thereby enabling the one or more users to interact with the data structure by means of the user interface, using one or more computer processors.

According to some embodiments (whether method, system or computer program product), the data entities are displayed by means of the user interface, enabling one or more users to interact with the data structure. The user interface, in turn, enables a user to define the relationships between new and existing data entities without having to understand the nature of the relationships in the underlying data structure and without explicitly specifying the desired changes to the relationships.

While manual input to the user interface suffices in many situations, once a mass of processed data related to a user is archived, it is desirable to interactively link new inputs by the user and data processed by other users. Just setting aside vast amounts of curated data for a user does not take advantage of the great productive and useful aspects of a body of networked data that can enable a user(s) to connect his or her current activity with what has already been curated by that user and others, as well. Therefore, in some embodiments, in order to facilitate achievement of this potential, a navigation means is provided to permit a user to move smoothly from a global view of the thought cloud to a more local view.

In these respects, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION

Definitions

Figure 1A:
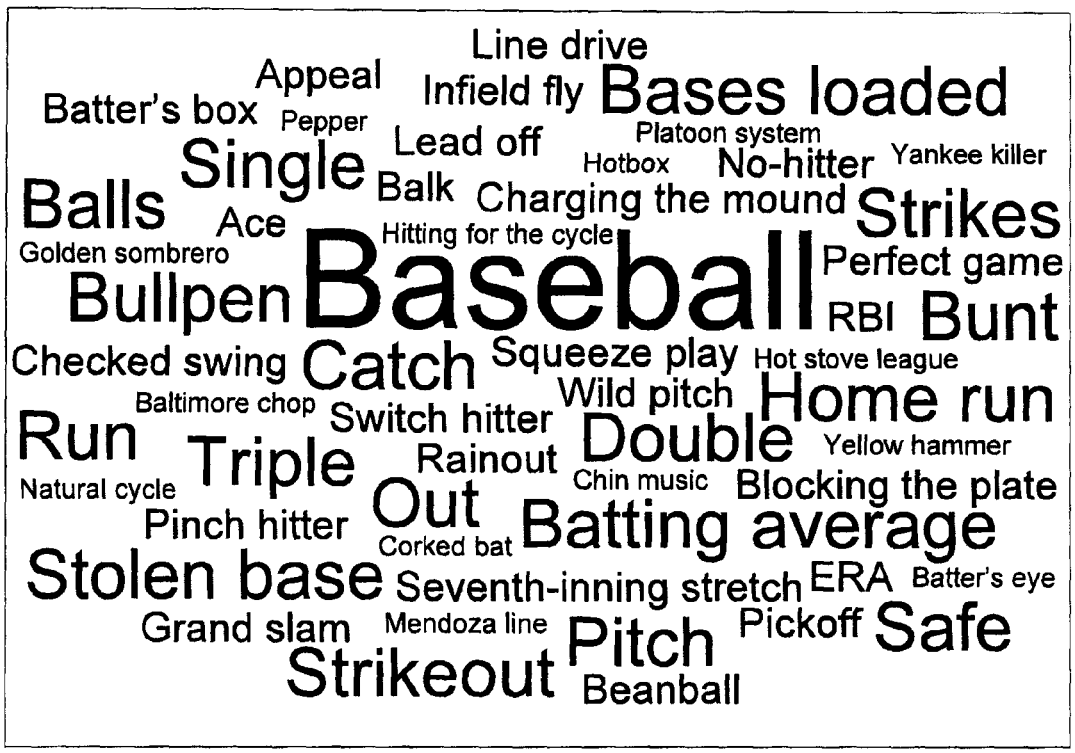
FIG. 1A illustrates a tag cloud of the prior art.
Figure 1B:
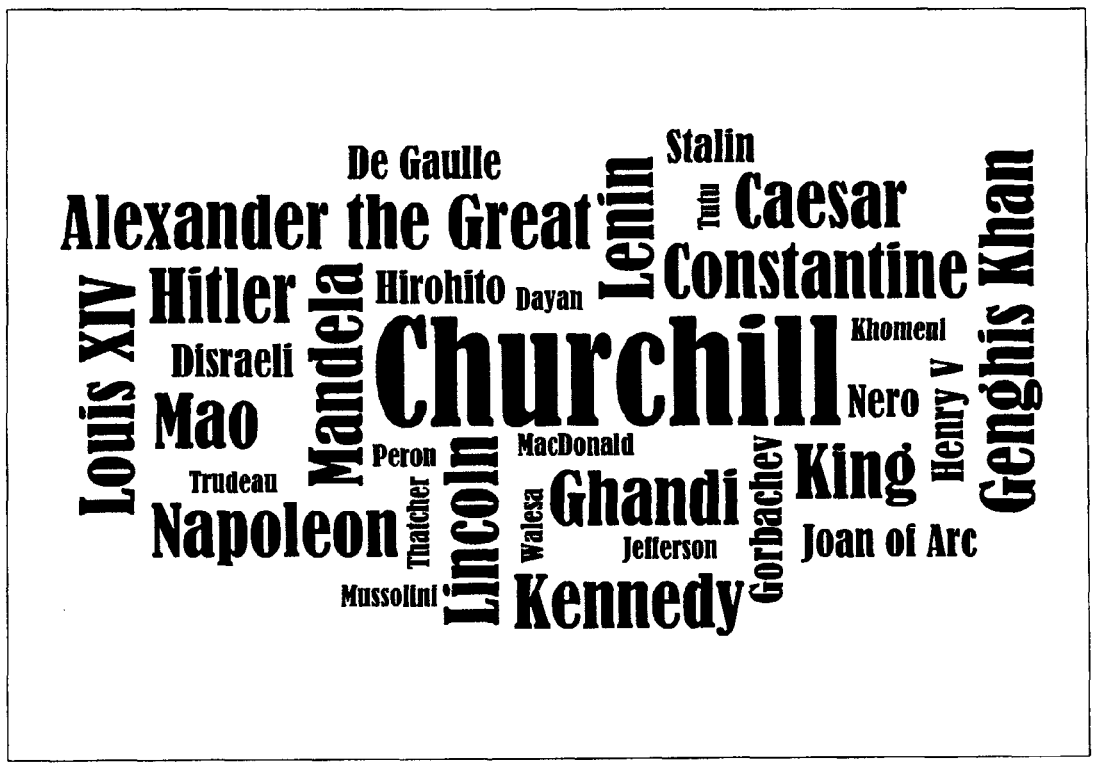
FIG. 1B illustrates another tag cloud of the prior art.
Figure 1C:
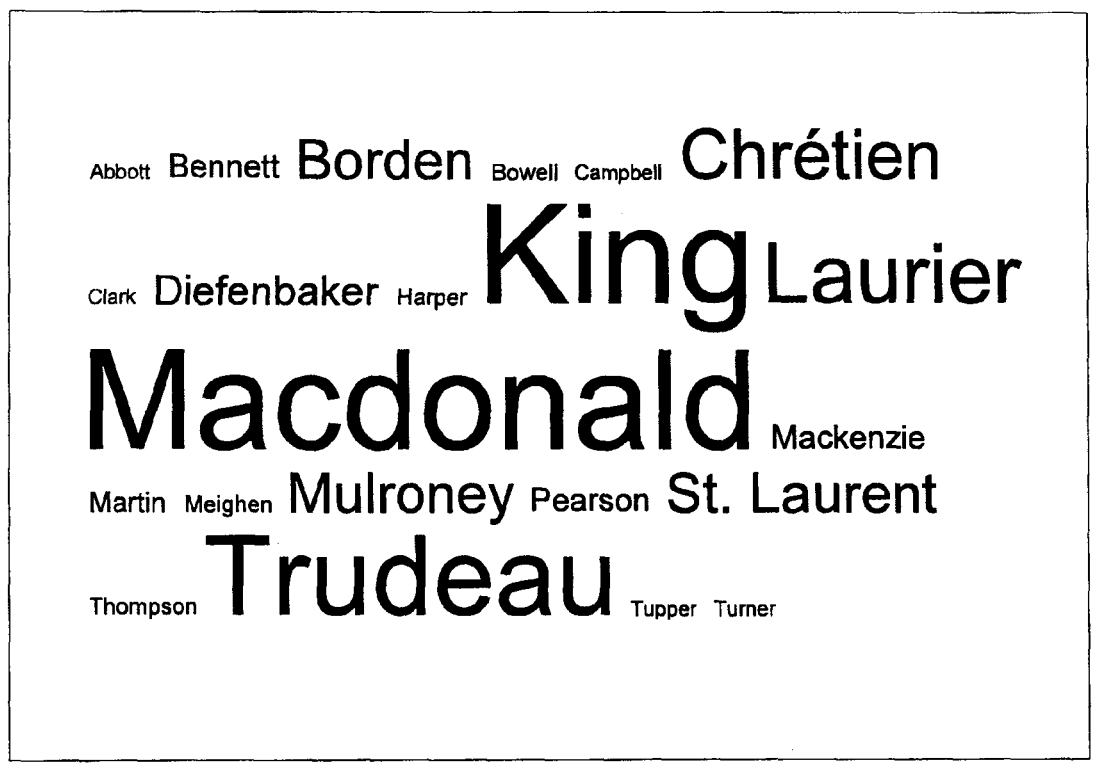
FIG. 1C illustrates another tag cloud of the prior art.

Data structure includes a means of organizing and accessing an information store comprised of knowledge representations based on relational links between data entities in the data structure.

Data entity means a knowledge representation present with a data structure.

Relationship includes hierarchical, polyhierarchical, associative, equivalence or other relationship between data entities in a data structure.

User context property means any quantitative or qualitative aspects of a concept that a user wants to portray in a data structure using an interface as taught herein, including for example relative topical importance, time, chronology, and/or physical attributes such as temperature, pressure, etc.

Concept, in the context of a semantic network, includes an embodiment of a data entity wherein each concept may represent a thought of a user.

Active concept means a concept under consideration.

Depth, in the generation of a semantic network, means a particular number of relationships distanced from the active concept within which to generate or display the semantic network.

Overview

Embodiments described herein provide a user interface to create, visualize and manipulate a data structure (e.g., for a semantic network). The user interface provides an input means to the data structure and, to a degree, a mechanism for viewing the data structure or a portion thereof. The data structure may comprise data entities and relationships between the data entities. One or more user context properties may be associable with the data entities such that, for example, the data structure may be reflective of a user context. In this regard, the user context may, but not necessarily, result in relationships between data entities being hierarchical, polyhierarchical, associative or equivalence.

The data entities are displayed by means of the user interface, enabling one or more users to interact with the data structure. The user interface enables a user to define the relationships between new and existing data entities without having to understand the nature of the relationships in the underlying data structure and without explicitly specifying the desired changes to the relationships.

The data structure may be a semantic network, wherein the data entities may be concepts. The semantic network may be provided by a semantic engine, for example as provided in PCT/CA2009/000567 to Sweeney et al. The semantic network may be variously structured, including hierarchical, polyhierarchical, cyclic, or acyclic data structures.

The user interface is designed for enabling a user to easily create, visualize and manipulate the data structure. Specifically, the data structure is represented in an easy to understand and intuitive format and enables the user to seamlessly manipulate relationships in the semantic network. The user does not have to understand the nature of the relationships in the underlying data structure or even have knowledge of the existence of relationships between any of its concepts. Rather, the relationships are defined based on the way in which the user thinks about the concepts in relation to one another.

For example, where the data structure is a semantic network, the user interface enables the creation and management of a contextual or graphical representation of the semantic network. The user interface is populated with interface components that are matched or correspond to the concepts and relationships. The interface components may, for example, be labels corresponding to representations of the concepts.

The user interface enables a layperson computer user to interact with a semantic engine for generating and refining a semantic network (which for example might include managing the relationships between concepts at one or more relationship levels in the semantic network and adding, editing or removing concepts).

The relationships are managed implicitly through the user's interaction with the user interface rather than requiring the user to explicitly define the changes to relationships in the semantic network. The labels or other interface components populated on the user interface are mapped to the relationships. The relationships are inferred from the mapping of the concepts on the user interface as managed by the user, which may reflect the way in which the user thinks about the concepts in relation to one another. The user can also create, edit or delete concepts from the semantic network by manipulating the interface components. By managing this contextual or graphical representation of the semantic network, the user is actually causing the invention to automatically create or manipulate the relationships of the semantic network.

The representation may include a plurality of dimensions in visual space for mapping one or more various properties or attributes relating to the data entities. The one or more properties may, for example, be visual properties including position, size, colour, distance, typeface, underlining, outlining, weight, gradient, time, and any other visually meaningful attribute.

The user interface may be understood as a thought cloud, that is, a cloud of tags in which a user's thoughts are manifested. The thought cloud is operable to display to a user a plurality of labels that reflect concepts that are related in the underlying semantic network, and are arranged as labels in the thought cloud based on their relationships. In this way, various user context properties of the underlying data structure and the relationships between entities in the data structure may be represented in the visualization.

A user may interact with the user interface to further create, visualize and manipulate the semantic network, for example to manage the semantic network in such a way that it reflects the way in which the user thinks about the concepts in relation to one another. The user may be provided with tools by the user interface including adding concepts to the semantic network and manipulating the relationships in the semantic network. In this way, a user is not burdened with managing, or even having an understanding of, the complexities of the corresponding data transformation formalisms that are being processed in accordance with the user's interactions with the semantic network. There is no requirement that the user interface explicitly display to the user the relationships among the concepts comprising the semantic network, however it may.

Embodiments disclosed herein also comprise a user interface for a semantic network in which users are provided with a plurality of suggested labels representing concepts in the semantic network that are potentially related to one or more labels input by the user to the user interface. The semantic network may comprise concepts and relationships between concepts. The user can optionally approve the suggested labels, whose mapping implicitly results in inferred relationships to other concepts in the semantic network, enabling the creation of new relationships from the existing concepts to the concept represented by the suggested label.

In the description that follows, a semantic network is used as an example data structure, and a thought cloud is used as an example user interface for the semantic network. However, it should be understood that the data structure could be any data structure comprising data entities and relationships between the data entities, wherein user context properties are associable with the data entities. Furthermore, it should be understood that the term "thought cloud" is used for convenience only.

Thought Cloud

Embodiments disclosed herein also comprise a user interface to create, visualize and manipulate a data structure that may, for example, be a semantic network comprising concepts and hierarchical or polyhierarchical relationships between the concepts. The semantic network, for example, may be provided by a semantic engine, for example as provided in PCT/CA2009/000567 to Sweeney et al., which is incorporated by reference, and may be initiated from an active concept. The user interface provides an input means to the semantic network that enables a user to manipulate relationships between new and existing concepts without having to understand the nature of the relationships in the underlying semantic network and without explicitly specifying the desired changes to the relationships.

The user interface enables the creation of a contextual or graphical representation of the semantic network. The user interface may be a thought cloud. The thought cloud displays to a user one or more interface components, that may for example be labels, corresponding to concepts that are hierarchically or polyhierarchically related in the underlying semantic network. The labels may have one or more properties wherein each property can be contextually or graphically represented. These properties enable each of the concepts to be represented by the user interface in an organized manner. This enables the user interface to represent the relationships without explicitly displaying the relationships to the user, so as to prevent confusion of users that do not have an understanding of the nature of existence of the relationships.

Whereas tag clouds are not interactive, a thought cloud is. Although tag clouds have been used as output devices, a thought cloud can also be used as an input device for enabling a user to create, visualize and manipulate the semantic network. The user may be provided with tools by the user interface including adding concepts to or modifying concepts in the semantic network and means by which to manipulate the hierarchical or polyhierarchical relationships in the semantic network without requiring the user to know it is doing so. In this way, a user is not burdened with managing, or even having knowledge of, the complexities of the corresponding data transformation formalisms that are being processed in accordance with the user's interactions with the semantic network.

A user of the thought cloud can, for example, move the labels relative to each other and change properties of the labels, which results in changes to the underlying semantic network without the user being exposed to the associated transformations. Thus a thought cloud enables a user to capture its thinking on a computer by creating, arranging and manipulating labels representing concepts in whatever way makes sense to the user. For example, there is no need for any particular alignment or arrangement of labels in a thought cloud, as the labels can be arranged and rearranged as the user desires.

Example Workflow

A user may use embodiments taught herein to create, visualize and manipulate a data structure that may, for example, be a semantic network. For example, the following workflow is one particular example usage of the present teachings. However, it should be understood that other uses are possible, for example where the data structure is a data structure other than a semantic network, or where the semantic network is fully generated by the user rather than a semantic engine.

The user may initially access the user interface and be provided by the user interface with means for inputting an active concept and optionally a depth. The user may input the active concept, which is obtained by a semantic engine. The semantic engine, in accordance with its implementation, generates a semantic network. The user interface displays to the user a thought cloud representing the semantic network. The thought cloud is optionally constrained to those concepts within the depth of the active concept, if the depth was specified by the user. It should be understood that the semantic engine may use the depth to limit the generation of the semantic network from the active concept.

The user then can visualize the semantic network by the thought cloud. The user may navigate the thought cloud, for example by panning across the thought cloud or zooming in and out of the thought cloud. The user may manipulate the labels representing the concepts as displayed in the thought cloud. For example, the user may move one or more of the concepts on the user interface, or may manipulate one or more properties of one or more concepts. Each manipulation is processed by the invention, which automatically alters the semantic network to reflect the user's manipulations of the concepts in accordance with translation rules.

The user can also add or delete concepts in the thought cloud. When adding a concept, the user may define properties for the concept. The concept and its properties can be processed by the invention, which automatically alters the semantic network to reflect the addition of the concept based on its particular properties in accordance with translation rules.

The user interface can provide the user with a means by which to save the semantic network it has created and manipulated. The user may save a plurality of its created and manipulated semantic networks, for example representing the semantic network at different historical points or dates. The user interface can also provide the user with a means to restore any of the saved semantic networks.

Visualizing a Thought Cloud

The user interface may be a screen or a part of a screen that serves as boundaries for visualizing a thought cloud.

A user interaction may be used for determining a starting point for building a thought cloud initially, in order to prevent an unwieldy number of concepts appearing in the thought cloud. For example, a semantic engine for generating a semantic network may be provided for receiving user interaction information (a context) from which an active concept may be derived. The semantic engine may be, for example, that described in PCT/CA2009/000567. The active concept could be considered the starting point for visualizing the semantic network. A depth may be provided so that only those concepts in the semantic network that are related to the active concept within the depth are displayed by the user interface.

Alternatively, to deal with space constraints, the user interface could include the ability to vary resolution, mimicking motion in the z-direction by zooming in and out. The user interface may also provide the ability for panning vertically and horizontally to navigate through different areas of a thought cloud. When panning, a concept that happens to fall near a particular area of the user interface, for example in the centre, can be used as an active concept to further display the semantic network.

The concepts and relationships between concepts can be represented by one or more properties or attributes, including for example visual properties, in accordance with a set of translation rules. These properties may include x, y and z coordinates; size; colour; distance; typeface; underlining; outlining; weight; gradient and any other visually meaningful attribute. Each of the properties is associable with a user context property of the underlying data structure (such as the meaning of a concept or the type of relationship defined by the translation rules, including, for example, order, confidence, time or prevalence). These extensible properties enable the invention to work with any range of complex concepts and complex relationship types (including hierarchical, associative, or equivalence relationships). There may be any number of translation rules provided for associating properties of the underlying data structure with the properties of the visualization and interactions.

Figure 2:
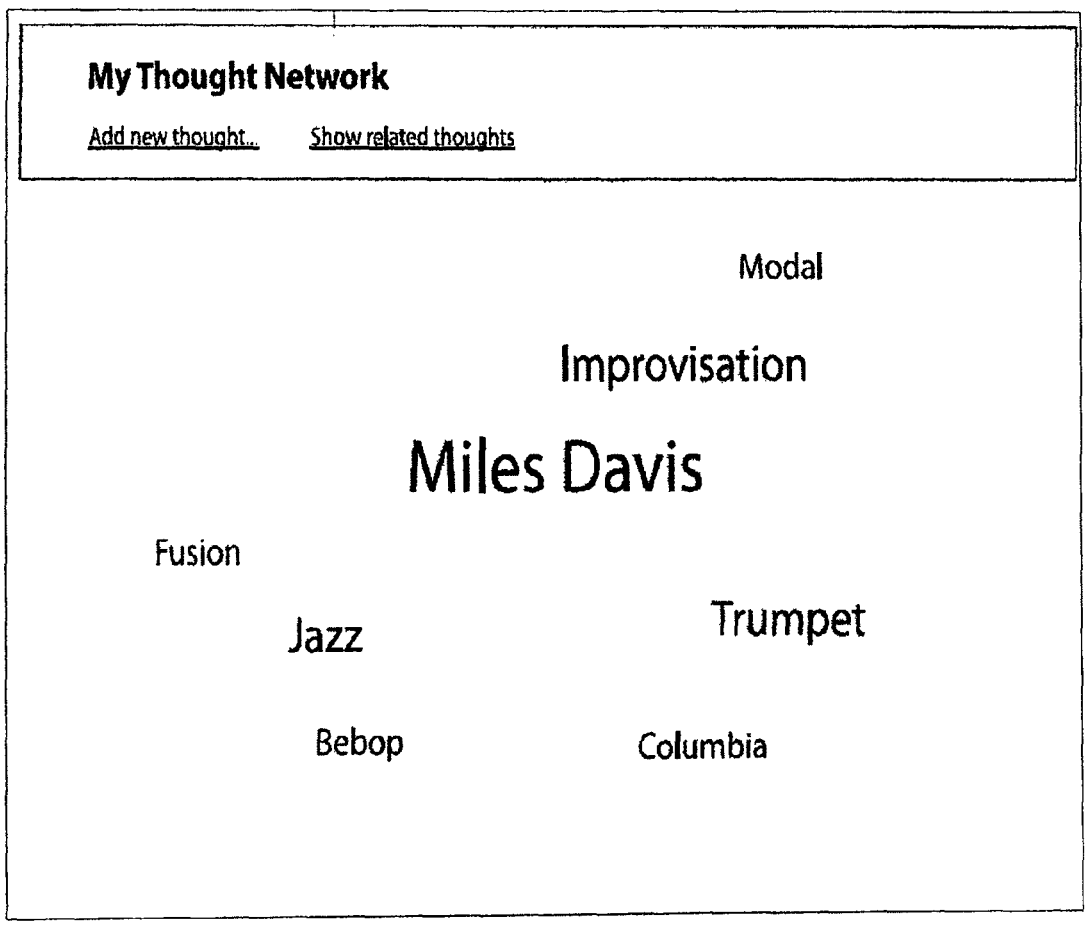
FIG. 2 illustrates an example of a thought cloud as intended herein.

FIG. 2 illustrates a thought cloud in one particular example. An importance or depth in the semantic network (from the active node or concept) could be represented in a thought cloud as size of a label, parent-child relationships could be represented by relative position between concepts where the closest larger concept is the parent, the order of sibling concepts could be represented by a distance from a common original or the distance to a parent concept, and the source of the concept (for example, the user providing the concept) could be represented by colour. It should be understood that the specific visual properties used to represent the relationships between concepts in the thought cloud can vary.

Figure 8:
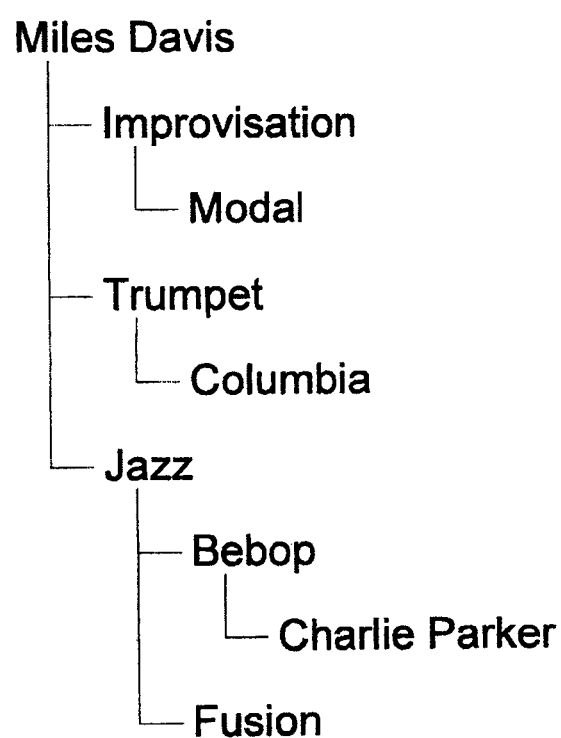
FIG. 8 illustrates an example of a hierarchical semantic network operable with some embodiments implementing aspects of the system and method disclosed herein.

For example, consider the semantic network comprising the hierarchy shown in FIG. 8. In this example, concepts with the largest text size are at the root level of the semantic network while concepts with the smallest text size are at the leaf level. For any other concepts, the nearest larger concept is its parent (for example, a concept in font size 8 has a parent that is the nearest concept whose size is greater than 8).

As shown in FIG. 2, for example, the active concept 'Miles Davis' is the parent concept for 'Improvisation', 'Trumpet' and 'Jazz', as it is the nearest larger concept for each of these child concept. Similarly, both 'Fusion' and 'Bebop' have 'Jazz' as a parent, 'Columbia' has 'Trumpet' as a parent and 'Modal' has 'Improvisation' as a parent. Additionally, it can be seen that 'Bebop' is more closely related to 'Jazz' than to 'Modal'.

The depth of relationships to be displayed by the user interface could be constrained by a depth, as previously mentioned.

Thus, the user interface as provided can be used for visualizing a hierarchical or polyhierarchical semantic network. In a strict hierarchy, each concept can have one and only one parent (except for the root concept, which has no parent), while in a polyhierarchy, each concept can have multiple parents. For example, a polyhierarchy can be visualized by placing a child concept equidistant from multiple same sized parent concepts.

Optionally, as it could be difficult to arrange concepts so that they are truly equidistant or of the same size, these or other properties could be divided into configurable units and ranges. For example, within a unit or range the actual property value may vary but the semantic network may treat them as the same. Alternatively, distances and text sizes could be made to 'snap' to the nearest value on a configurable grid, where the grid would allow for a simpler placement of concepts.

Adding Concepts

Embodiments disclosed herein also comprise means for using the thought cloud as a means for the user creating concepts in the semantic network, and for automatically generating corresponding relationships in the semantic network.

Once the thought cloud has been visualized by a user, the user can add concepts to the thought cloud, which then are reflected as new concepts in the semantic network. The new concepts will have the relationships in the semantic network based on the user's configuration of the properties of the label representing the concept. Again, the user does not have to understand that the properties are reflective of the relationships of the concept to other concepts in the semantic network.

Figure 3A:
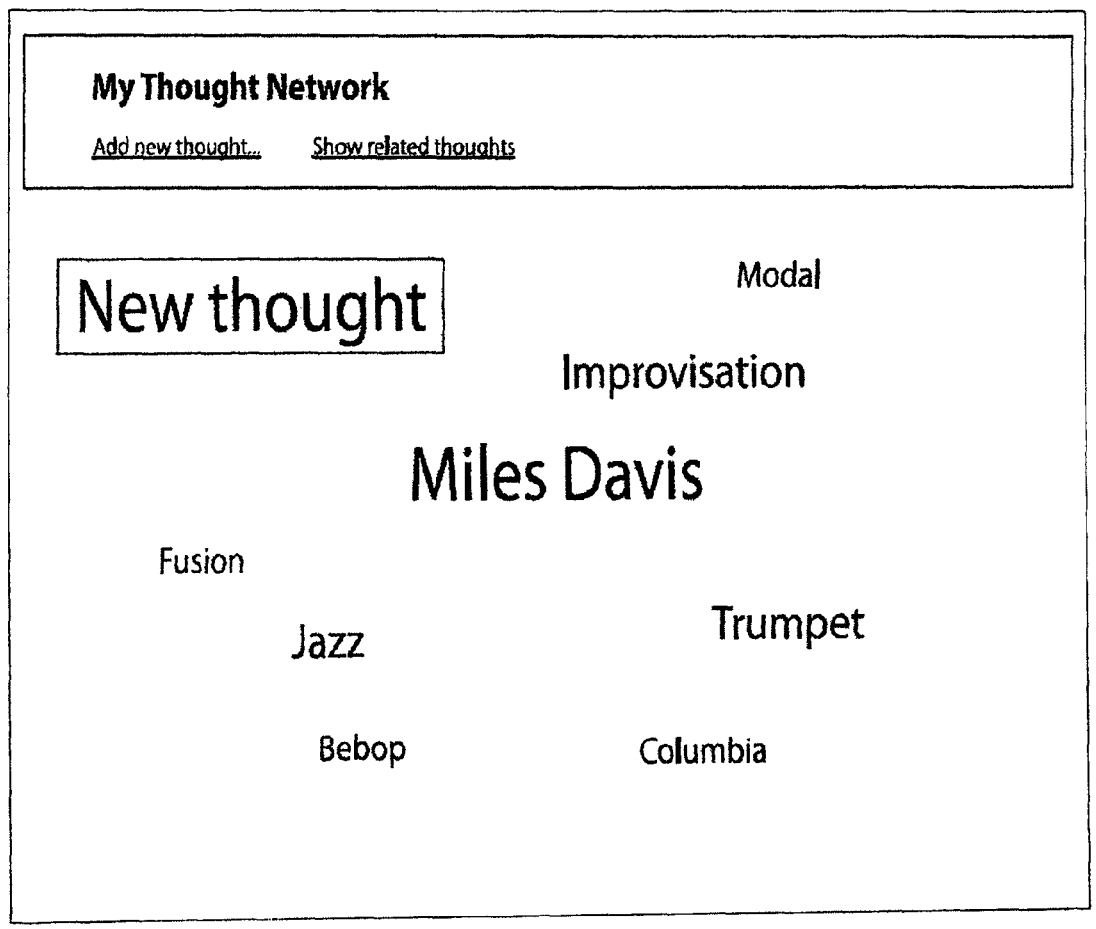
FIG. 3A illustrates inserting a new concept to the thought cloud.

FIG. 3 illustrates the addition of a new concept. A user could select a command for adding a new concept, which results in a new concept field being displayed in the user interface. FIG. 3A shows a label for a new concept added to the user interface. The label may be clearly marked as new for enabling the user to easily determine that it is a new and configurable label.

Figure 3B:
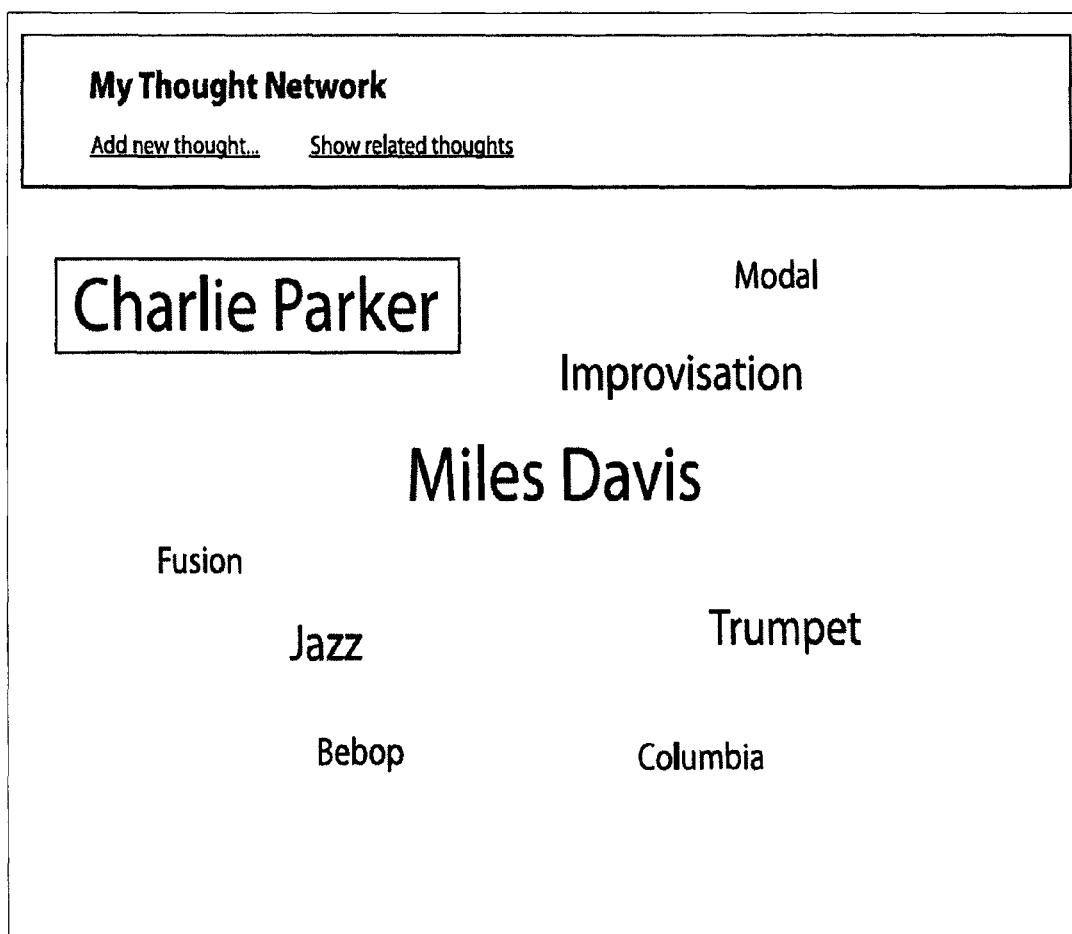
FIG. 3B illustrates changing a label corresponding to a new concept of the thought cloud.
Figure 3C:
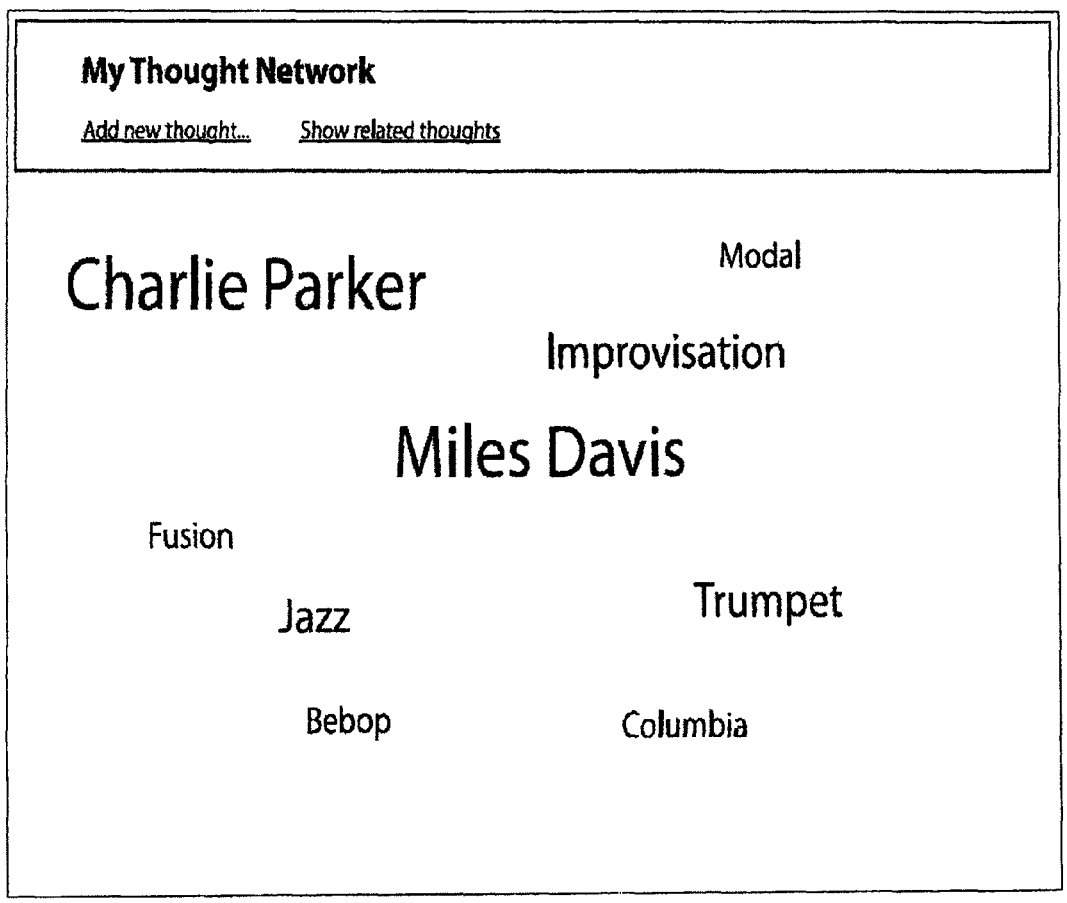
FIG. 3C illustrates a changed label corresponding to a new concept of the thought cloud.

The user could create a meaningful label for the new concept, as shown in FIG. 3B. Once the user enters a label, the label can become part of the thought cloud, as shown in FIG. 3C. Once added, one or more of the new concept's properties in the underlying semantic network are automatically generated based on the label's properties in the thought cloud, as previously described. A user can further manipulate the generated properties or create the properties for a label.

Manipulating or Deleting Concepts

Embodiments disclosed herein also comprise a user interface to enable a user to manipulate concepts in a thought cloud, resulting in automatic management of the concept and its relationships in a semantic network.

Figure 4A:
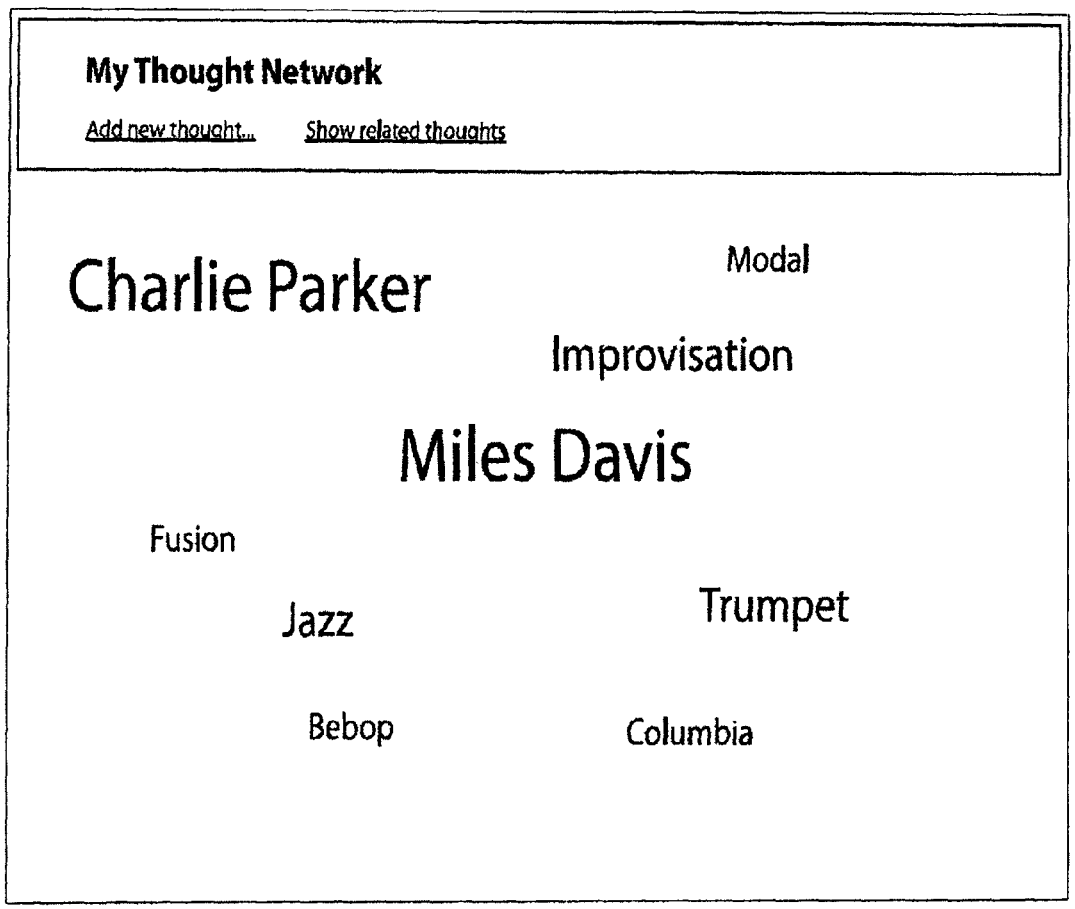
FIG. 4A illustrates a label corresponding to an existing concept of the thought cloud.
Figure 4B:
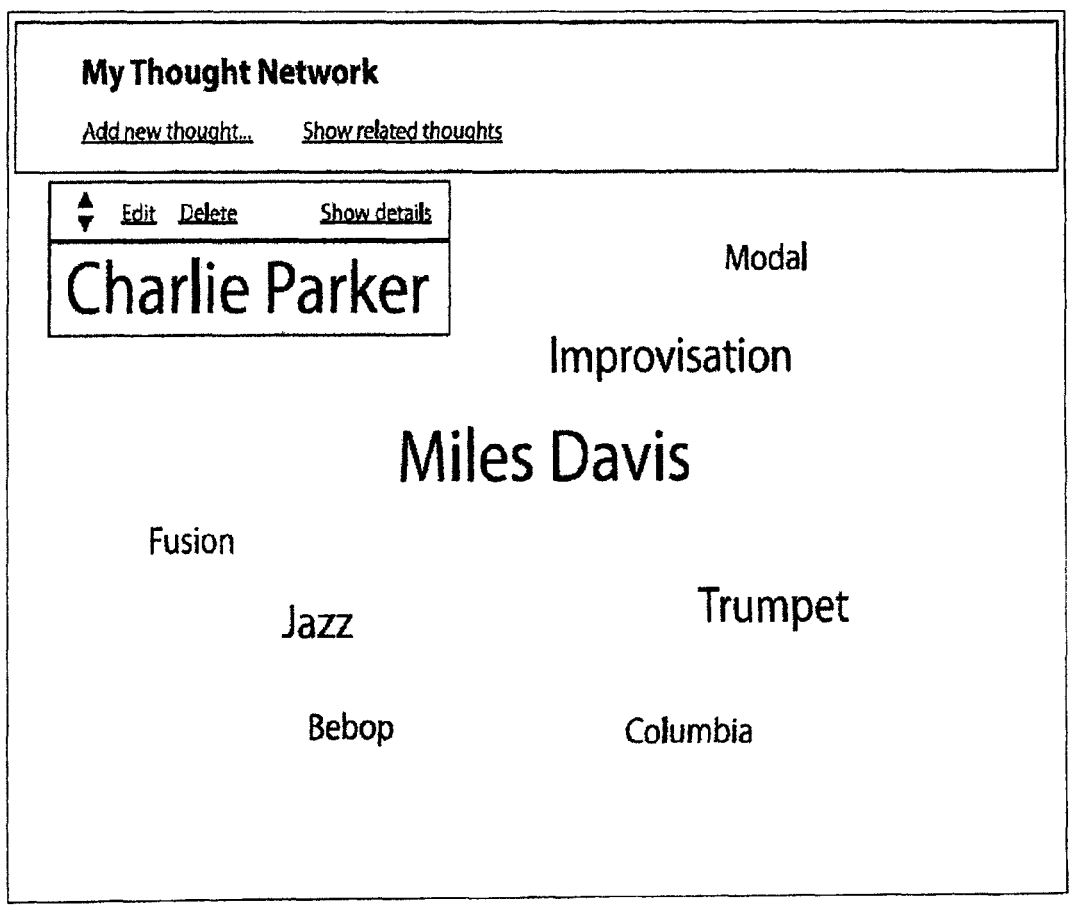
FIG. 4B illustrates a means for resizing the label's font in the thought cloud.

For example, properties or position of a new or existing label could be changed by the user. FIG. 4A shows a thought cloud. The user could select the concept to be manipulated by, for example, hovering a mouse pointer over the label corresponding to the concept or clicking the label. FIG. 4B shows a selected label. Once selected, a means for configuring the property, which may for example be a drop down list or a text box listing all possible configurations of the property, can be provided in proximity of the label to be configured. Options including means for configuring each property could be given to the user. The user could also be presented with options for deleting the label altogether, which would remove the concept from the semantic network.

Figure 4C:
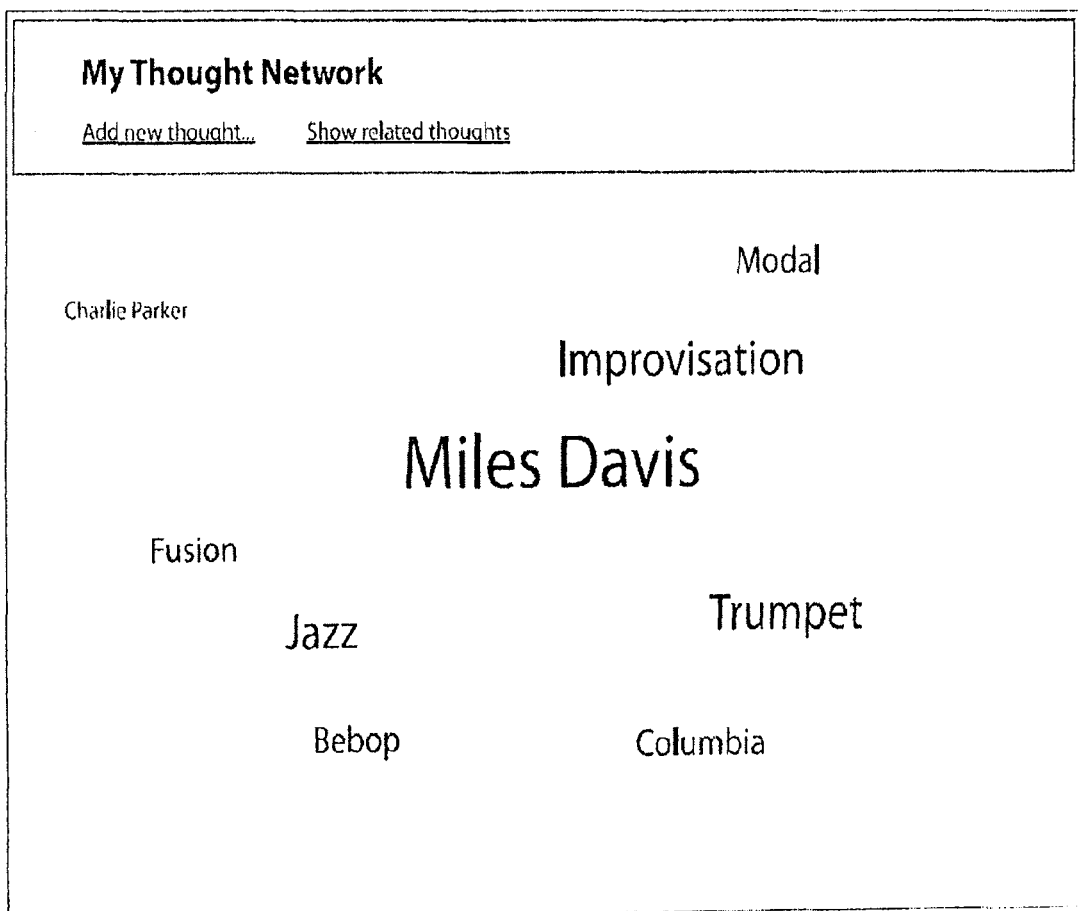
FIG. 4C illustrates a resized font of the label.

For example, the user could configure the font size of a label. The user interface could provide up and down arrows to increase and decrease the font size, respectively. The user could, for example select a down arrow to reduce the font size of the label and, once the user is satisfied with the changes to the properties, deselect the label to apply the configuration as shown in FIG. 4C.

Figure 5A:
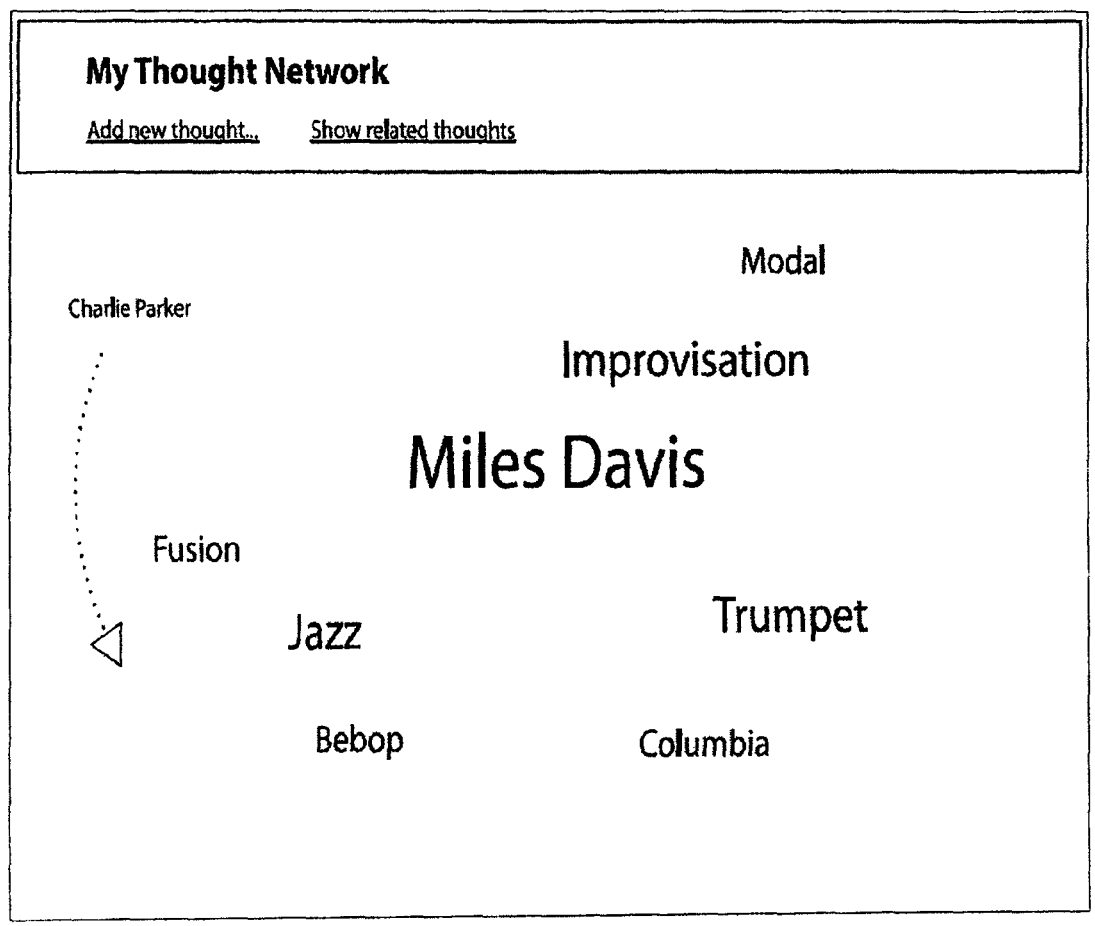
FIG. 5A illustrates a label of the thought cloud to be repositioned.
Figure 5B:
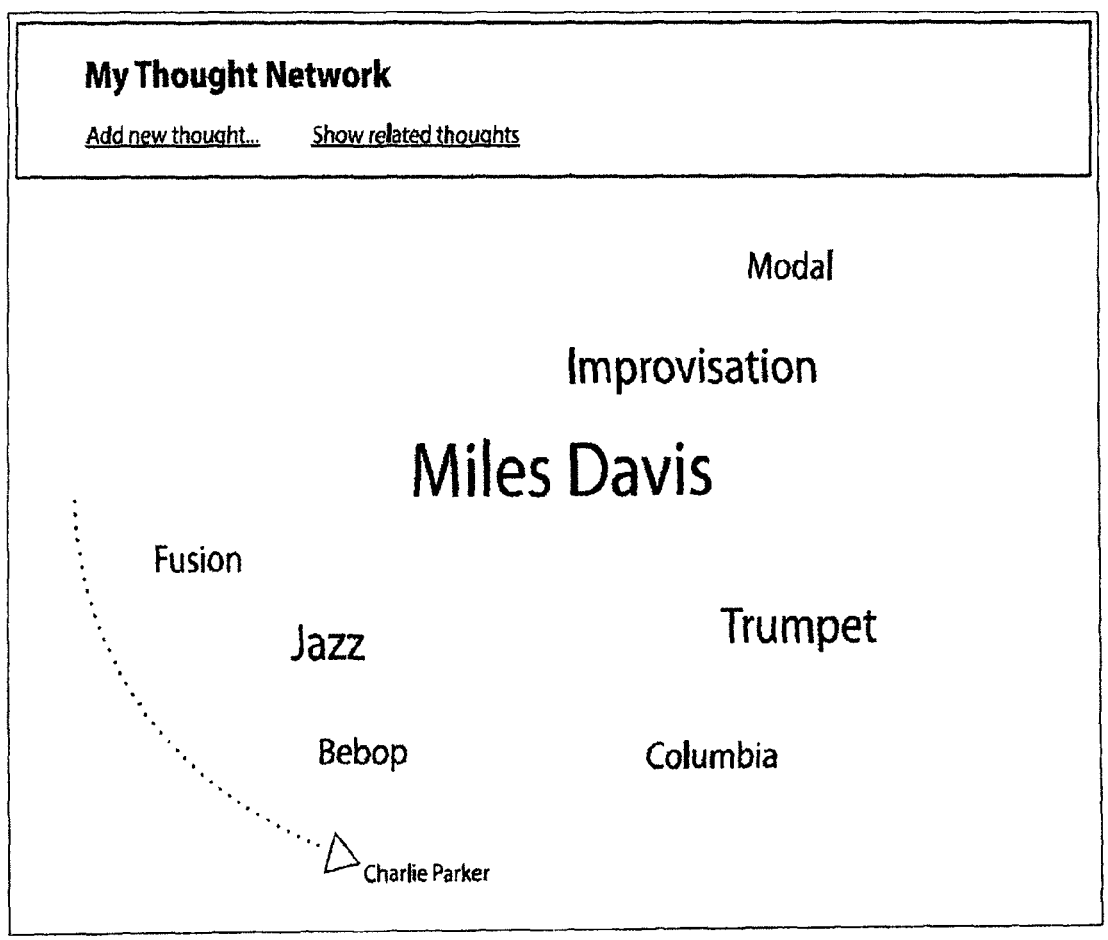
FIG. 5B illustrates repositioning the label.
Figure 5C:
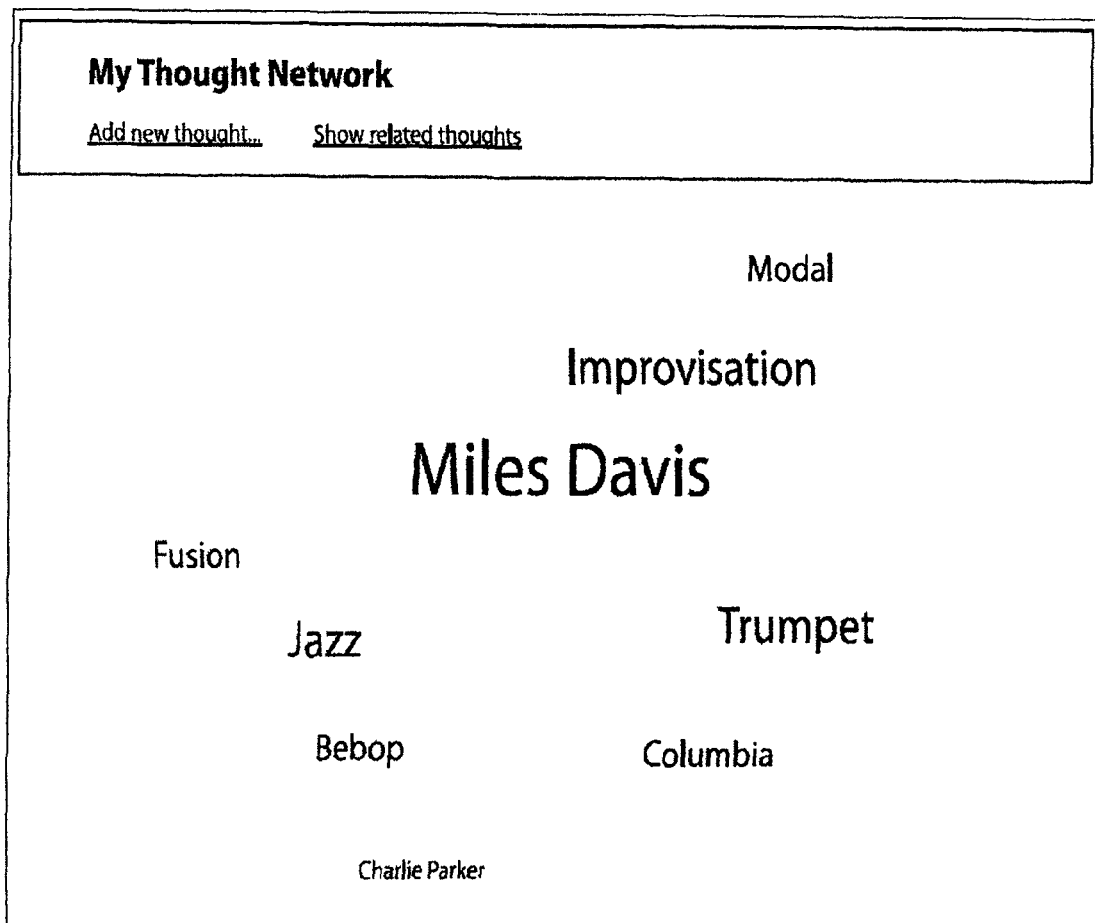
FIG. 5C illustrates a repositioned label.

Labels could also be repositioned to alter the relationships between concepts of the semantic network. FIG. 5A illustrates a label corresponding to a concept that a user desires to move. The user could select and move the label, for example by clicking the label and dragging it to a desired location as shown in FIG. 5B. The user could deselect the label to apply the configuration of the concept as shown in FIG. 5C.

The user's manipulation of the properties of labels can be processed by automatically altering the relationships between concepts in the underlying semantic network in accordance with the translation rules.

Similarly, concepts could also be removed from the semantic network. For example, the user may select a deletion command to remove the concept. Concepts related to the active concept of the semantic network only through the removed concept could optionally also be removed, however concepts having polyhierarchical links to the active concept of the semantic network may only have links through the removed concept severed while other links not through the removed concept may remain intact.

Similar processes could be provided for configuring any of the properties of the labels including, for example, geometric attributes including colour, weight, gradient, etc.

Once the configuration has been applied, the user's manipulation of the properties can be processed by automatically manipulating the concepts and relationships between the concepts of the semantic network in accordance with the translation rules.

In certain data structures, particularly those that are not polyhierarchical data structures, there may be a need for resolving ties caused by ambiguous manipulations of new or existing labels. However, resolving ties can also be used with polyhierarchical data structures, for example to limit the number of polyhierarchical relationships.

For example, in a semantic network, a concept placed equidistant between two potential parent concepts could cause a tie. The potential for ties increases as the underlying semantic network is developed. A set of tiebreaking rules could, therefore, be provided for resolving ties. For example, when using the earlier set of sample translation rules, the system may need to break ties when determining parent-child relationships. If a concept has multiple larger concepts that are the same shortest distance from it, these criteria could determine which one is the parent. An example set of tiebreaking rules for this purpose could include, in order: (1) the larger concept is the parent; (2) rank on some other established property of the concepts, such as the time of the most recent change, the confidence of the relationship, the distance from a common origin or the alphabetical order (the property chosen for this ranking can be anything that makes sense for the particular thought cloud); (3) the number of generated or user-defined properties for the label corresponding to the concept; (4) if polyhierarchies are not allowed, then make a random selection; (5) prompt the user to select the parent; (6) if polyhierarchies are allowed and the tie is not broken by the first or second of the above criteria, then all the candidate concepts may be deemed to be parents of the child concept.

Continuing with the same example, the system may also need to break ties when determining sibling order. If two or more concepts are the same distance from the common origin (or from their parent concept, if using it instead of an origin), these criteria could determine which sibling has precedence: (1) The larger concept is the earlier sibling; (2) rank on some other established property of the concepts, such as the time of the most recent change, the confidence of the relationship, the distance from a common origin or the alphabetical order (the property chosen for this ranking can be anything that makes sense for the particular thought cloud); (3) make a random selection or prompt the user for the sibling order.

Creation and Manipulation

Additionally, concepts of a semantic network can be manipulated by adding detail to the concepts. For example, while the primary representation of a concept is its label, the concept may also comprise content, normally hidden from view, such as tags, notes, graphics, links to audio or video, or other content.

Figure 6A:
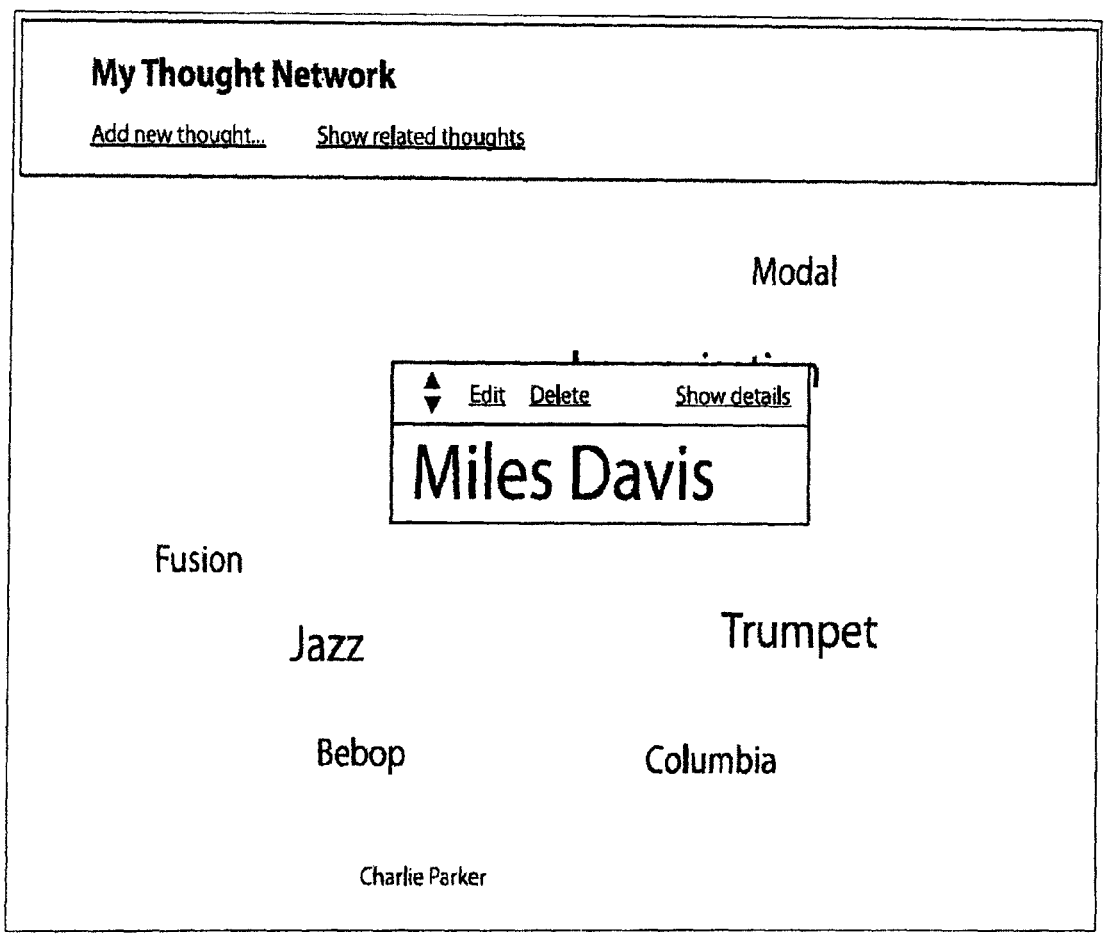
FIG. 6A illustrates a means for changing content related to a concept.
Figure 6B:
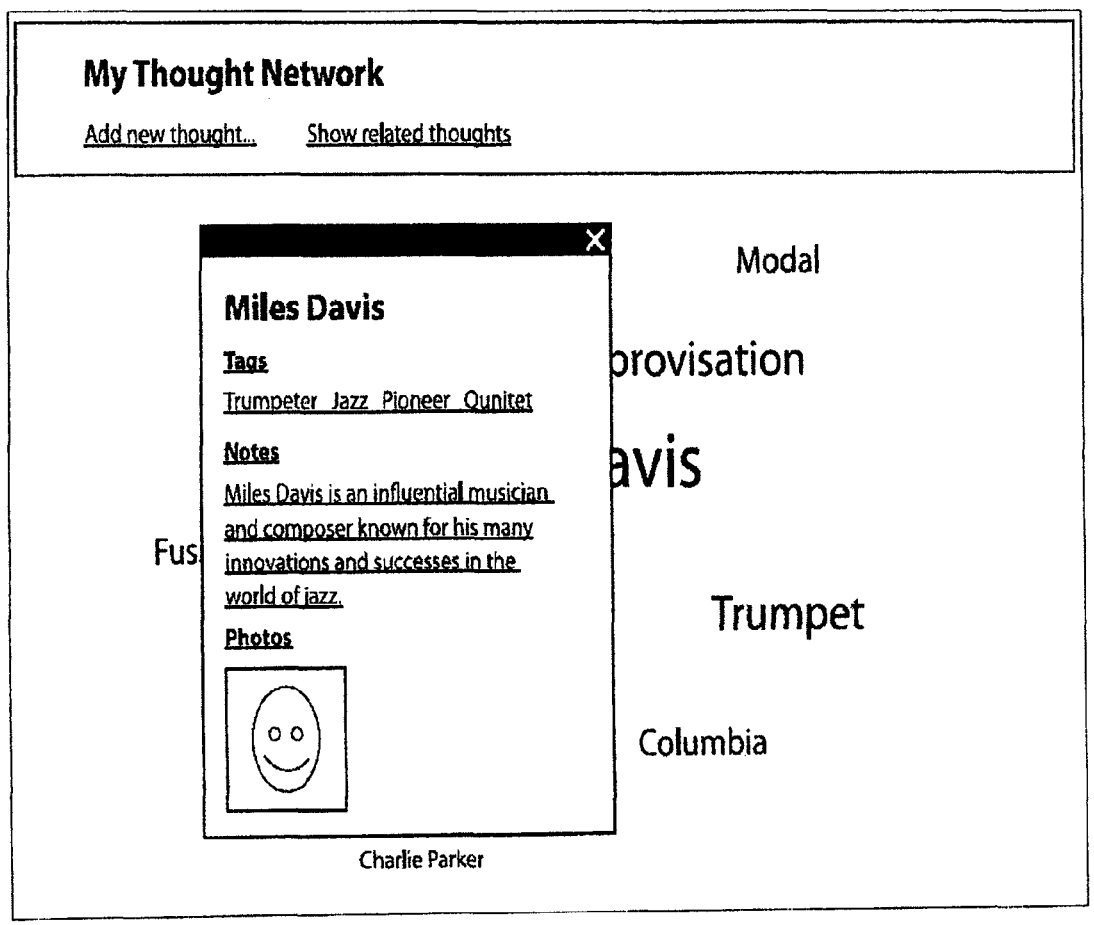
FIG. 6B illustrates content related to a concept.

For example, a user could select a label for a concept of the semantic network which may result in a means for viewing content, which may for example be presented by a drop down menu or a text box displaying the content or a portion thereof, related to the concept, as shown in FIG. 6A. The user could select to view the content, which results in the content being displayed, as shown in FIG. 6B. The content could be displayed in an editable format, enabling the user to manipulate the content. Once the label is deselected, the content may again be hidden and the content could be applied back to the semantic network. The user could also access the means for viewing content for the purpose of creating content corresponding to the label.

Augmentation

The user interface may also provide users with a plurality of suggested labels representing concepts that are potentially related to one or more labels input by the user to the user interface and/or labels displayed to the user on the user interface. The user may select one or more of these inputted and/or displayed labels, whether directly or indirectly related in the underlying data structure, to be presented with suggested labels from the semantic engine.

Suggested labels may change based on the one or more properties of the one or more labels input by the user, for example based on a label's position or size. The suggested labels may changed based on changes to the one or more properties, and may changed due to addition, deletion or modification to other labels.

The user can optionally approve the suggested labels, enabling the automatic generation of new relationships from the existing concepts to the concept represented by the suggested label. Again a semantic network will be used as an example data structure however the following could apply to any other data structure.

Concepts related to those represented in the thought cloud may be suggested by an associated semantic engine, such as that described in PCT/CA2009/000567. These concepts can be from another semantic network (created by the user or someone/something else), from a domain of information, or from a combination thereof. The user can set a minimum and/or a maximum value of some criterion (for example, density or confidence) for the inclusion of concepts in the suggested set. If a minimum and maximum are set the user can create a window for inclusion rather than a simple hurdle.

Figure 7A:
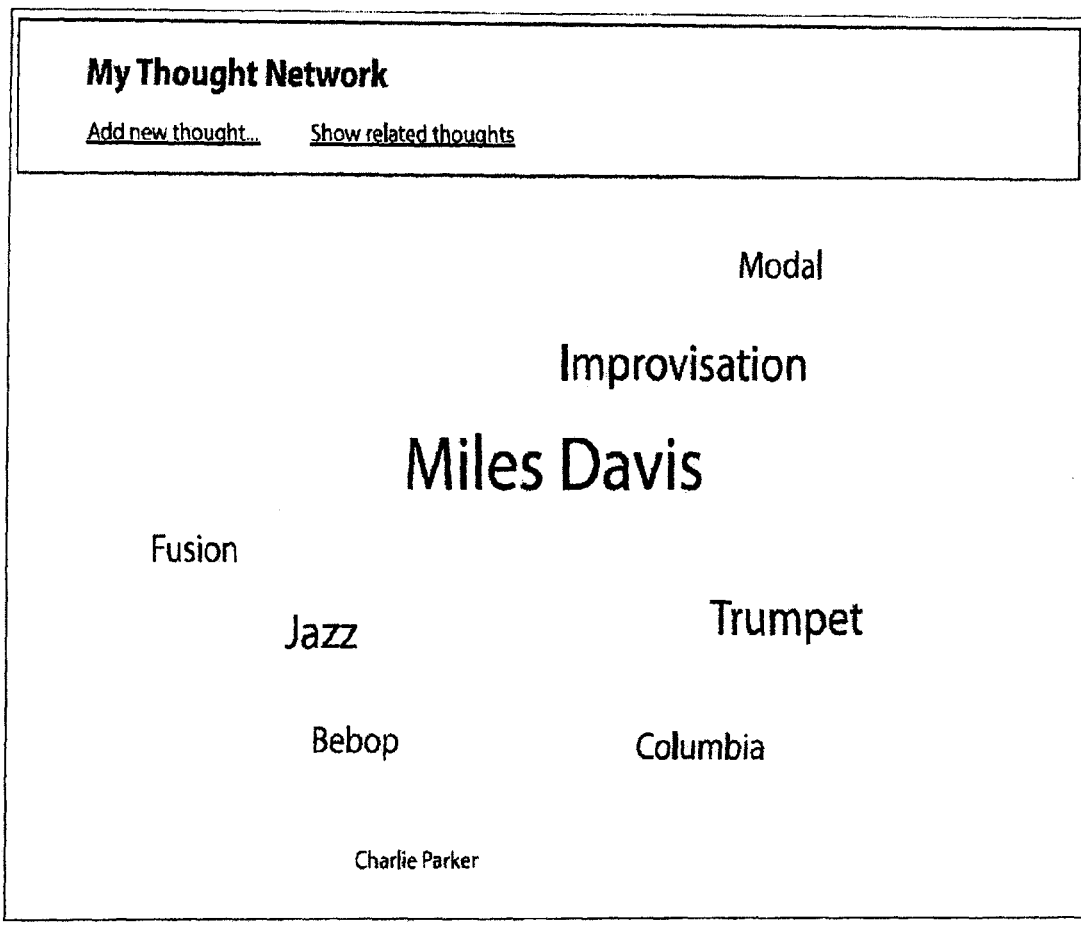
FIG. 7A illustrates a thought cloud.
Figure 7B:
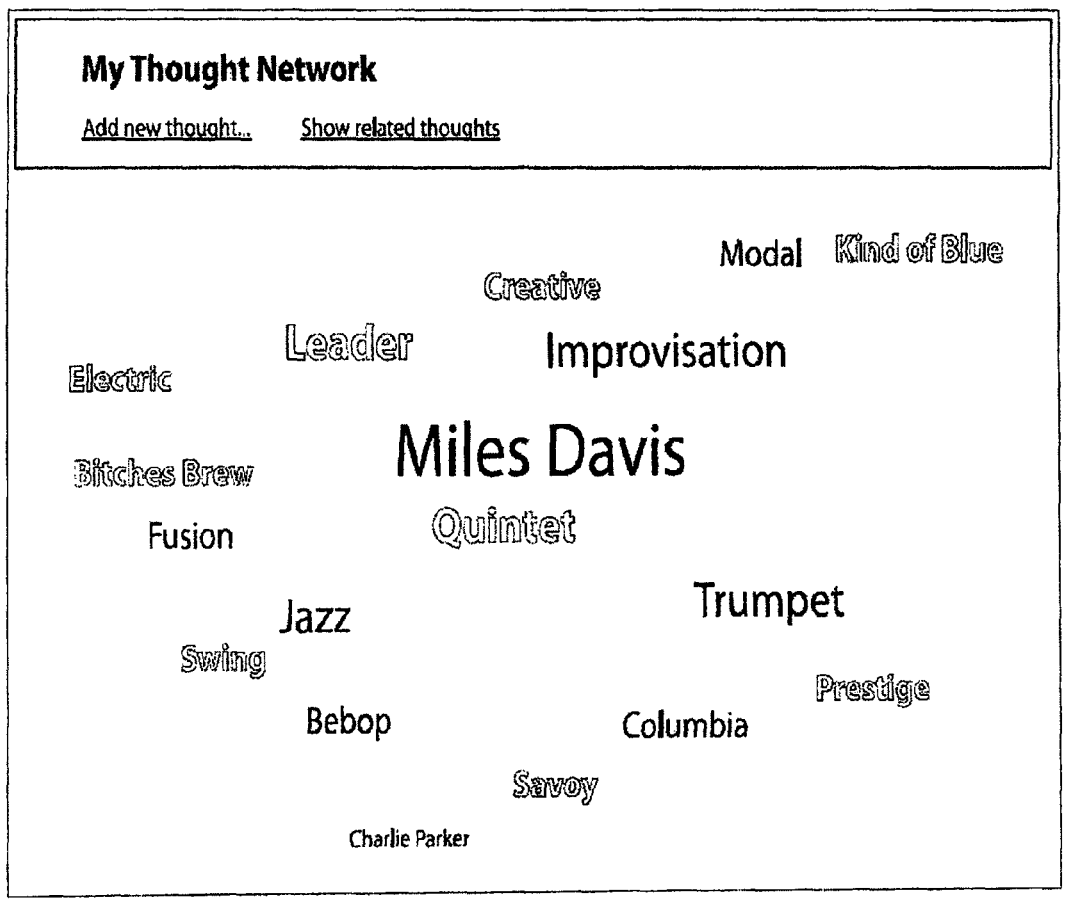
FIG. 7B illustrates suggested concepts shown in the thought cloud.

Related concepts can optionally be distinguished from the user's own concept by using a distinguishing means, for example colour, shade, opacity, gradient, or a geometric attribute. Consider, for example, the thought cloud of FIG. 7A. Labels for related concepts could be presented in a panel of the user interface that is separate from the one containing the user's original thought cloud. Alternatively, as shown in FIG. 7B, labels for the user's concepts can be displayed using different font attributes than labels for the suggested concepts.

A Global/Local Interface Implementation

Figure 9:
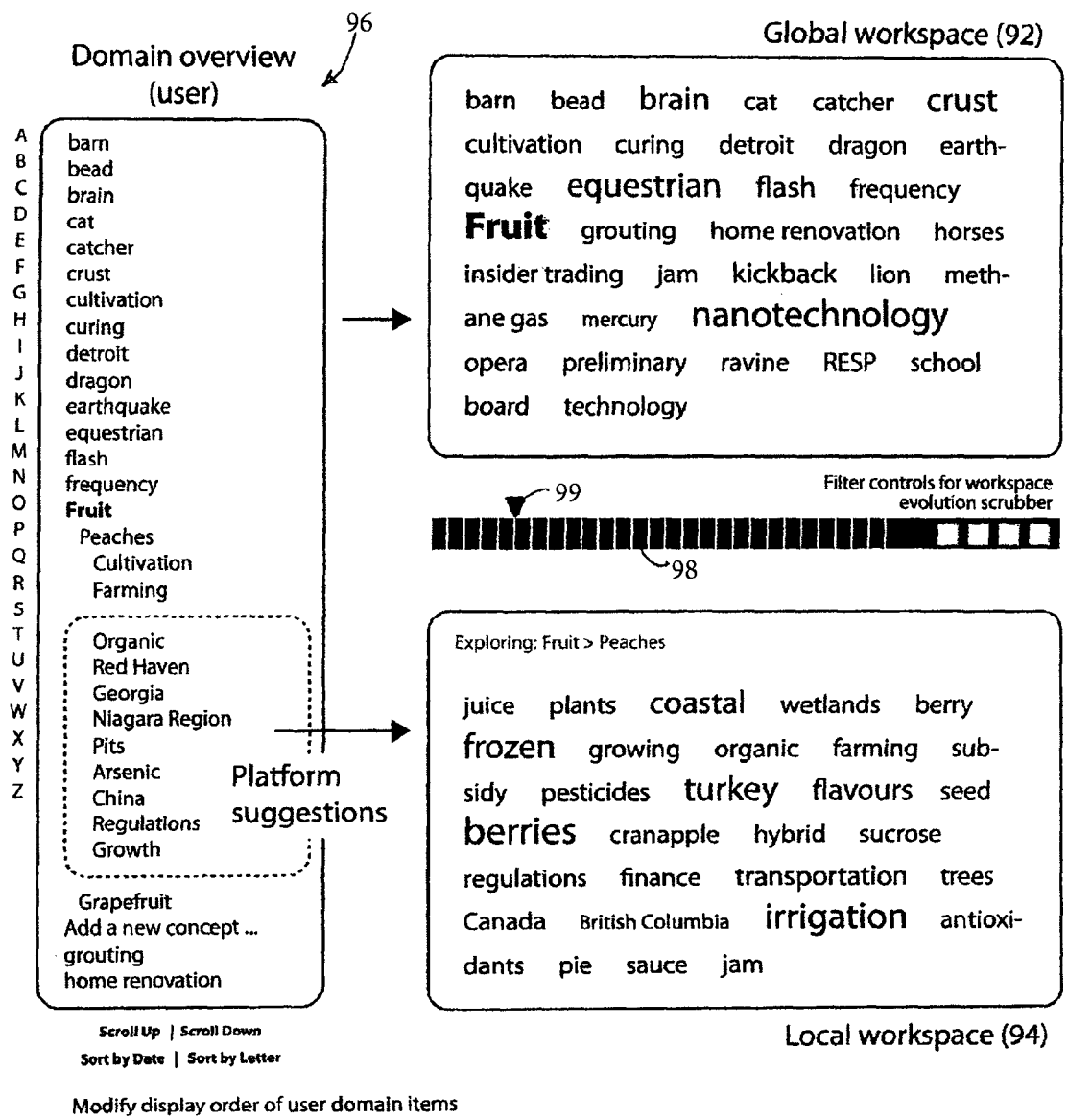
FIG. 9 illustrates an example of a user interface (UI) such as might be used to implement some aspects of the invention, in some embodiments, to provide a way for users to navigate between global and local views of a thought cloud and to manipulate, and explore relationships among, data in an underling semantic network's data structure.

Turning to FIG. 9, there is shown another embodiment of a user interface having three sections (e.g., windows or frames)—top section 92, bottom section 94 and left-hand section 96 on a display (e.g., computer display screen). Sections 92 and 94 comprise workspaces where a tag cloud (or a portion thereof) is depicted visually. The upper portion 92 represents a global (i.e., high level) view of the tag cloud such that all (or a selected portion of) the data curated by a user using the interface is contained within the view. A user may navigate the global view with conventional zoom, scroll or cursor functionality. The lower portion 94 represents a "local" view—i.e., a view of a selected portion of the global view. In the example of FIG. 9, the tag "fruit" in section 92 has been selected, as indicated by the dashed lines behind that word, suggesting selection of the tag and surrounding area. In the lower portion 94, a view is shown of other tags associated with the tag "fruit," such as at lower levels in the network hierarchy.

The lower section 94 of the interface may have the functionalities and capabilities of the user interface (UI) as described above relative to FIGS. 2-8. By using this enhanced UI, a user is able to move seamlessly from a global view to a local view by just selecting a part of the global view in upper section 92 and seeing a corresponding local view in lower section 94. The user can then curate the selected cloud area now visible in the lower portion 94 of the interface (i.e., tags—and even portions or whole semantic networks) can be added to, edited from and generally modified). This seamless transition from global to local views allows a user to explore and drill down into the user's concepts, simplifying the building of better knowledge networks.

Such an interface can be further enhanced to allow tag or thought clouds of different users to be merged in part or in their entireties by a user. Preferably, such a merging operation is conditional on the user obtaining permission from the other users whose clouds are being merged, of course. This turns such an embodiment into an environment or platform supporting collaborative activity wherein a user is able leverage the insights of other users when allowed to refine his or her thoughts about a concept.

As it is generally known that concepts often are defined differently by different individuals, having access to differing points of view may bring about different relationship suggestions and, as such, enhanced brainstorming about a topic.

Yet another variation on the interface embodiment(s) is to add the capability for a user to transport a portion (or its entirety) of the user's knowledge network (tag cloud) into someone else's knowledge network and from this operation find the linkages (e.g. concepts in common or concepts that are semantically related) between the transported content and the host content (tag cloud) and attach the two clouds at the linkages. This allows a user, for example, to look at the concept explorations conducted by other users about specific topic and will allow the other users to share portions of their knowledge networks. For example, multiple researchers may be exploring the same concepts and each of them may have built his or her own thought (tag) cloud. They can then export/import the thought clouds of one or more of the others to look at the different concepts that have been explored, or even the different points of view they bring to the study, and then selectively enhance their own semantic networks. This approach can also be extended to exporting/importing complete thought clouds from other users.

To consider another use of the foregoing system and method, the upper portion 92 of the FIG. 9 interface may display represents a global view of curated data from all users in a community—i.e., a thought cloud for a collective sematic network. In such a scenario, anyone in the community can select a portion of the global view and edit it before archiving. Further, using the lower portion 94 of the interface of FIG. 9, any user from the community can add concepts, curate and then archive those changes to the global view. Optionally, community users may be given the ability (rights) to see the changes that (all or select) other users have made. Within a corporation for example, permissions to view and change data might be given on a departmental basis. That is, different departments (from an enterprise perspective) may participate through creating legends or other identifiers for their changes (e.g., blue represents the legal team, red represents the design team, green represents the research group, etc.).

The lower portion 94 may also show the evolution of concepts that deal with specific topics (e.g., everything that relates to the topic of aviation, where "aviation" is a tag from the global view), relationship between these concepts (e.g. parent, associative, etc. as evidenced by the visual properties as described in FIGS. 2-8), concepts which are only related to particular geographic regions (e.g., aviation in Germany) and show the evolution of concepts through time (e.g. when the ideas were conceived, when relationships were explored, when new concepts were added, omitted, etc.)

When it is desired to be able to keep track of changes to the data over time, by time and who made the change, the underlying semantic network data structure may be augmented to include or to couple to a database having time-series capability, such that each change is recorded in the database and labelled by a time stamp and user identification. If users are organized into groups, an aspect of the database or a related database or table would include user-group affiliations.

In some embodiments, a variant of the foregoing example is to facilitate collaboration by making the lower portion 94 of FIG. 9 independent of the upper portion 92, as a standalone UI. With this arrangement, any user from the community can add concepts, curate and then archive them within the independent lower portion 94.

In some embodiments, changes to a thought (tag) cloud may be tracked over time, including the identity of each person making a change. Changes may be tracked by, for example, a time-series database or in a separate database table of a relational database or in any other satisfactory manner that will readily be known to those skilled in computer science. In some embodiments, the user interface shown in FIG. 9 may include a slider bar 98 which can be manipulated by a user to position an indicator 99 along the slider bar to select a time along the time line represented by the slider bar, with a corresponding display in selected upper section 92 or lower section 94 then showing the state of the selected workspace cloud at the selected time.

There are at least two ways to generate the display of the state of a cloud at a selected time. In a first approach, the state of the cloud can be recorded at various times, either automatically as by taking "snapshots" at predetermined intervals or when certain events occur (e.g., changes to the cloud). In a second approach, the display may be generated by searching the records of changes to the cloud from a beginning time and dynamically re-creating the state of the cloud at the desired time. Both approaches are contemplated, the selection being a matter of design choice based on the tradeoffs between factors such as memory and processing overhead.

By time-tracking and contributor-tracking changes to a tag cloud, a user may be able to see evolution of the concept through time, when ideas were conceived and by whom, when relationships were explored, when new concepts were added, omitted, etc. Further, if the tag cloud content of another user was imported, the evolution shows this contribution as well. This capability thus enables a user is able to move through the user's thought cloud an such a way that the user is provided with the ability to perceive on a linear path how he or she thought of (or came up with) their ideas, when they were generated and who influenced an idea. This ability will provide the user to move through the tag cloud to see how it expands, changes and grows.

The left section 96 comprises a list of terms/concepts, showing their relationships in a linear way. When a given concept is selected, and sub-cepts are displayed, the other concepts are deselected. Selection may be indicated by a color or font change for ease of visualization, for example. Concepts listed this way are intended to differ from each other in kind. Use of the list form of displaying concepts is optional with respect to sections 92 and 94, but may be a helpful way to identify and select concepts for the workspaces.

Such embodiments also subjectively allow users to define large concepts and see how these evolve. They also show users the semantic connections between one part of their global thought cloud to the other; and from each relationship, infer other possible relationships. In addition, the UI allows users to scan root level concepts, find relationships and consequently explore these relationships. In finding relationships, the UI provides users with a semantic intersection between two terms. This can be done through query expansion, which can allow synthesis of new relationships. Alternatively, instead of waiting for manual searching for relationships, the UI may automatically show the users deep connections between various concepts in their thought clouds. The system optionally may provide the user with an indication that these relationships exist and the choice of being able to explore these relationships if they so wish to do so.

A UI such as is illustrated in FIG. 9 may be utilized in a variety of ways, including allowing the user to look at the highest level concepts and see the commonalities between disparate areas of knowledge. For example, the user may drag or select "Detroit" and "nanotechnology" from the top, global user-pane containing a variety of disparate concepts, into the lower, local user-pane, which will thus contain concepts in common to, or at the intersection of, those disparate concepts. Although "Detroit" and "nanotechnology" appear at first blush to be disparate areas of knowledge, concepts in common or at the intersection of both "Detroit" and "nanotechnology" would be synthesized and added to the lower pane. Such common concepts may include nanotechnology companies residing in the city of Detroit or the Michigan Nanotechnology Institute for Biological Sciences located in the greater Detroit region (i.e., Ann Arbor).

The UI may also let users identify relationships and organize concepts according to how important they are to the user. The UI provides to the user a feedback mechanism which allows users to infer possible relationships between tags and then to explore them. Thus, the curated data which may be part of the global view may be analyzed by a user for relationships or, alternatively, relationships can be detected automatically and suggested to the user (who may adopt or reject them)

The UI of FIG. 9 further may be provided with the capability of allowing the user to attach links, notes, files, etc. to the concepts in the user's thought cloud and even allowing the user to have an expanded view whereby it can tell the user more about what is written for each concept. This additional information may include an indication of what is "underneath" a concept (i.e., how deep and how many concepts there are for each particular concept). There also may be an indication of which underlying concepts a user already has explored and which have not been explored, using any desired legend or indicia; as an example, using bold type for those already explored or providing a window listing those concepts which have been explored). The idea is, preferably, to make the user aware of this information without necessarily drilling in or navigating away from the main view.

An additional advantage or use at least some embodiments of the above-described UI is that it can be used to curate ideas from other applications to be related to a thought cloud. Such other application may, for example, be an online media service. For example, a data mining application may parse through a page (e.g., article, website, online journal, etc.) and capture links and place them in a relationship box, as a result of which the whole semantic network then is augmented by meaningful relationships from basically single words or phrases.

In another use, such a UI may be employed to harvest the meaning attached to a particular word and from these meanings, identify other concepts. Indeed, one may automate the whole process—i.e., build the knowledge network without doing any work. An automated process may comprise the steps of semantically understanding a page, ranking the concepts within the page and taking the top-ranked concepts and relating them to the user's network.

The benefits of collaborative activity also may be obtained by using user visitations to the thought clouds/web pages of others to "cross pollinate" that user's own thought clouds. By tracking the user's visitations, on return to the user's thought cloud, the interface may show possible relevant additions based on the visits.

Figure 10:
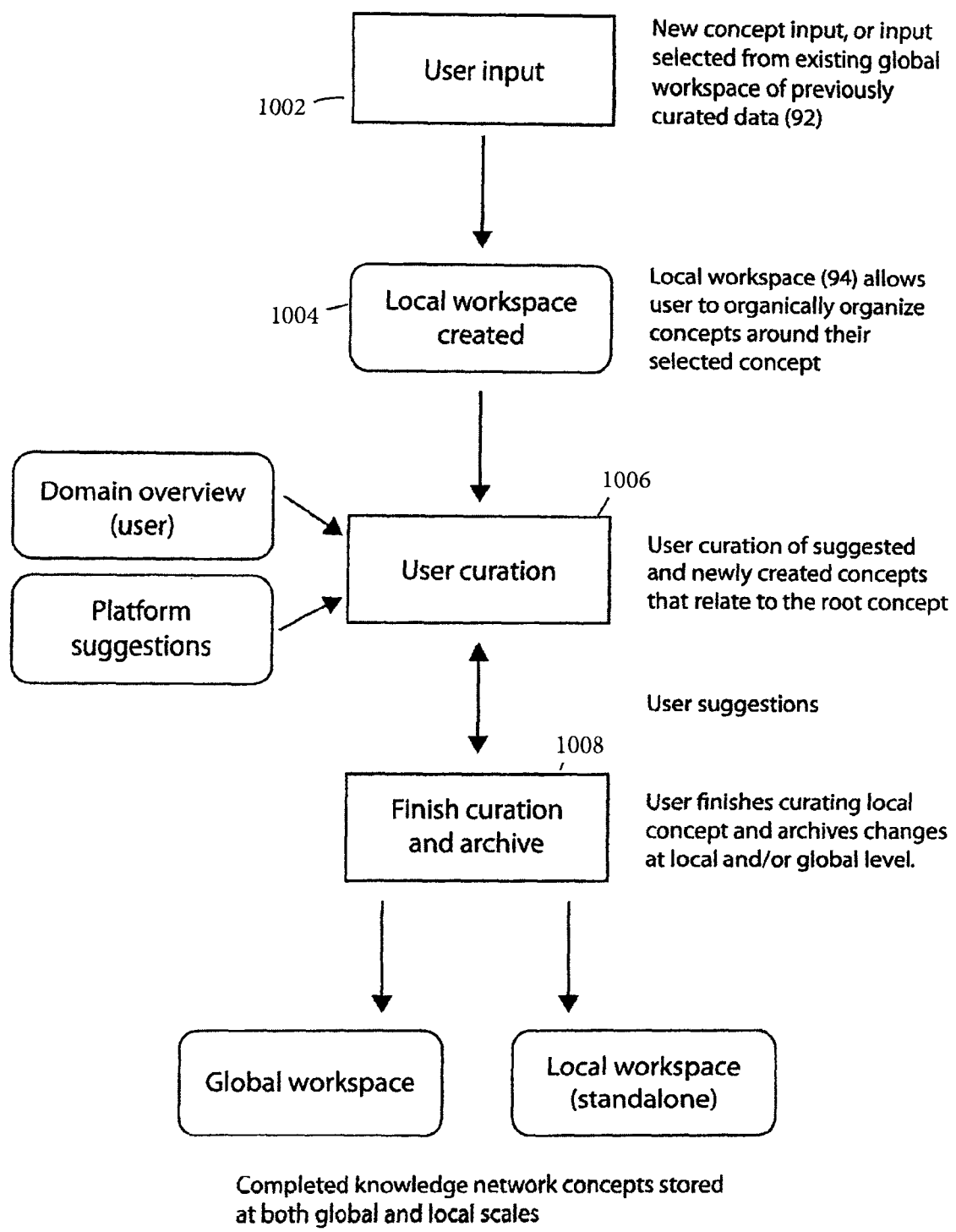
FIG. 10 is a flow chart showing an example of how the UI of FIG. 9 may be used to implement some of the methodology discussed herein.
Figure 11:
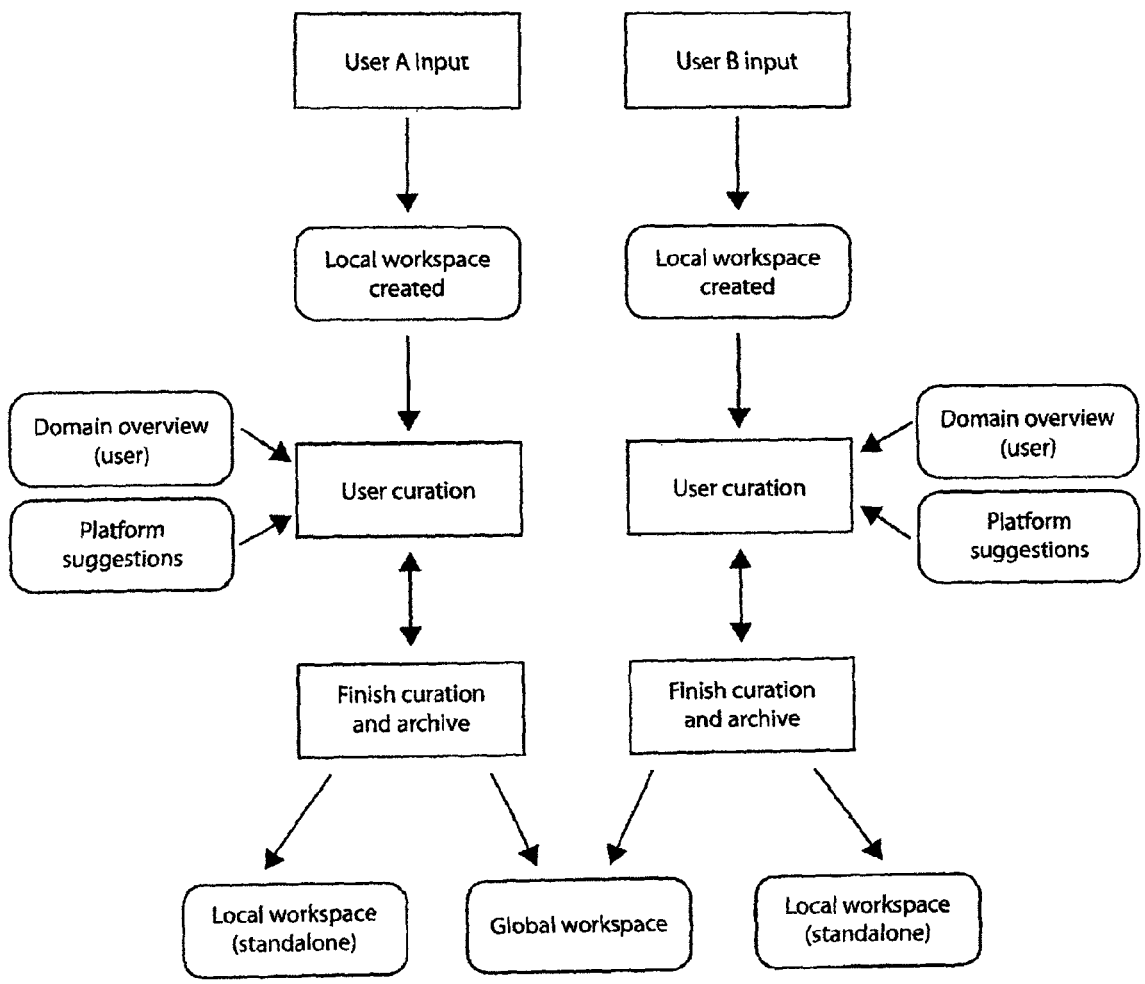
FIG. 11 is a flow chart showing an example of how the UI of FIG. 9 may be used to support collaboration via a shared global workspace view of a thought (tag) cloud.
Figure 12:
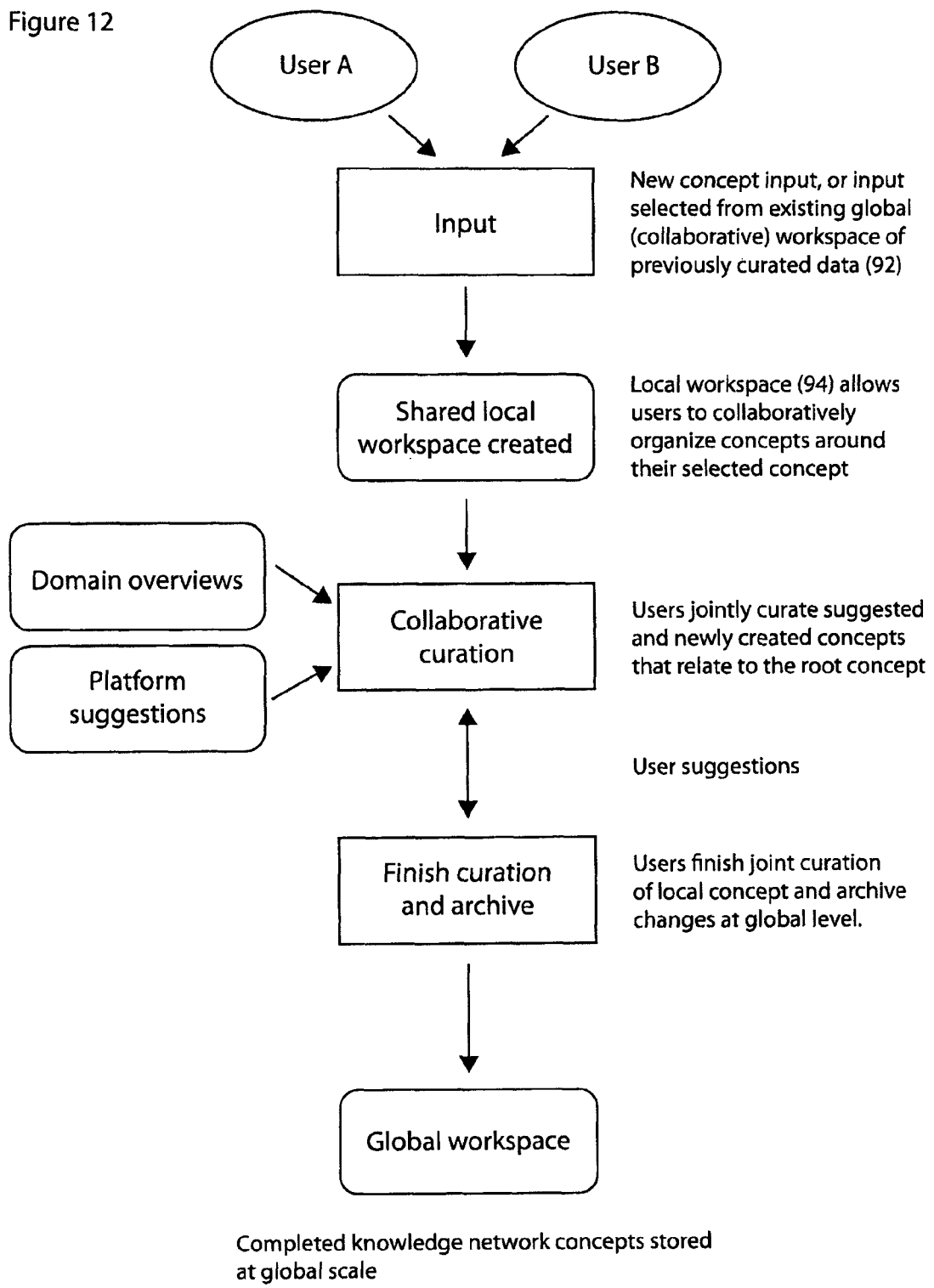
FIG. 12 is a flow chart showing an example of how the UI of FIG. 9 may be used by multiple users to jointly curate concepts relating to a root concept.

With this background, attention is now directed to FIGS. 10-12.

In the example process reflected in FIG. 10, starting with step 1002, a user provides new concept input or input is selected from an existing global workspace 92 of previously curated data. A local workspace 94 then is created, step 1004, providing a place for the user to organically organize related concepts around the selected/newly input concept (called the "root" concept).

The user then curates system-suggested and newly created concepts that relate to the root concept. Step 1006.

At some point, the user finishes curating local concepts and archives changes at both the global and local view (workspace) levels. Step 1008. This results in a new global workspace 92A and a new local workspace 94B.

In FIG. 11's process, two users, A and B, each curates his own local workspace and then store their resulting global workspaces collectively, so that the global workspace becomes a collaborative workspace.

In FIG. 12, by contrast, two users, A and B, create a shared local workspace, allowing them to collaboratively organize concepts (tags) around a concept they selected.

Additional Implementations

Instead of the proximity of labels representing the closeness of relation between concepts and size representing a concept's level in a semantic network, one could augment this approach by representing different levels of confidence in each concept with a gradient of dark to light text for their labels. If a concept suggested by the semantic networking system has a confidence of 0.1, its label could be shown in lighter text. If the user selects the concept, its confidence could change to 1.0, and its label would become dark.

Further extensions of a user interface of embodiments disclosed herein for creating, visualizing and manipulating data structures can be provided beyond thought clouds for semantic networking.

A different example could have a goal-planning application translate x-coordinate as date, y as projected cost and z (size) as importance. The user interface could include explicit axes for these physical dimensions to help the user interpret their meaning. Here, the date dimension could employ a text gradient in parallel with x-coordinate, with older goals having lighter labels.

The representation of time with a text gradient could also be applied to these examples. This way, the gradient would represent time instead of confidence.

The invention claimed is:

1. A computer network-implemented method for displaying a data structure and enabling one or more users to interact with the data structure via a user interface, the data structure including data entities and relationships between the data entities, the method comprising:

populating the user interface, via one or more computer processors executing stored program instructions, with text labels representing data entities from the data structure;

enabling a user to make a change to a first text label within the user interface using one or more computer processors, the user's change comprising a change to a position of the first text label from a first location on the user interface to a second location specified by the user on the user interface and one or more textual visual properties of the first text label within the user interface;

and automatically determining, based on the user's change to the position and the one or more textual visual properties of the first text label, a relationship between a first data entity and a second data entity in the data structure, wherein the relationship was not represented in the data structure prior to the user's change to the first text label, wherein automatically determining the relationship comprises applying translation rules to a combination of (a) at least one positional visual property relating the position of the first text label to a position of a second text label in the user interface, and (b) at least one textual visual property of the first text label and/or the second text label, after the user's change to the first text label.

2. The method of claim 1, wherein the at least one positional visual property comprises a distance between the first text label and the second text label.

3. The method of claim 1, wherein the at least one textual visual property comprises at least one property selected from the group consisting of: size, colour, typeface, underlining, outlining, weight, and gradient.

4. The method of claim 1, wherein the data structure is hierarchical or polyhierarchical.

5. The method of claim 1, wherein the first text label being the nearest larger sized text label to the second text label represents a hierarchical relationship between the first data entity and the second data entity.

6. The method of claim 5, wherein the hierarchical relationship can be user defined or defined by the data structure.

7. The method of claim 5, wherein a polyhierarchical relationship is represented on the user interface by the first text label and a third text label being equidistant from and equally larger sized than the second text label.

8. The method of claim 7, further comprising, via one or more computer processors, implementing one or more rules to address the polyhierarchical relationship based on: one or more visual properties of the first, second and/or third text labels; a number of generated or user-defined visual properties corresponding to the first, second and/or third text labels; a relationship confidence; random selection; user selection; allowing the tie; or any combination thereof.

9. The method of claim 1, wherein the data structure is a semantic network, wherein the data entities include concepts and the relationships include semantic relationships between the concepts.

10. The method of claim 9, further comprising suggesting, via execution of program instructions, a set of one or more additional concepts that are relevant to one or more of the concepts represented by text labels displayed on the user interface.

11. The method of claim 10, further comprising providing a mechanism enabling the one or more users to modify visual properties of the text labels to interact with the semantic network, and suggesting a second set of one or more additional concepts that are relevant to the concepts represented by text labels with the modified visual properties.

12. The method of claim 10, further comprising providing a mechanism allowing the one or more users to select any portion of displayed text labels that are used to suggest the one or more additional concepts.

13. The method of claim 12, wherein the selected portion of the displayed text labels may represent indirectly related concepts.

14. The method of claim 1, further comprising suggesting, via execution of program instructions controlling the user interface, a set of one or more additional data entities that are relevant to one or more of the data entities represented by text labels displayed on the user interface.

15. The method of claim 14, wherein the suggesting is performed in response to the one or more users selecting text labels representing the one or more data entities displayed on the user interface.

16. The method of claim 14, further comprising enabling, via execution of program instructions, the one or more users to modify visual properties of the text labels, and suggesting a second set of one or more additional data entities that are relevant to data entities represented by text labels with the modified visual properties.

17. The method of claim 1, wherein the enabling comprises providing a mechanism allowing the one or more users to modify a visual property of one or more text labels.

18. The method of claim 17, wherein the enabling comprises providing a mechanism allowing the one or more users to access and manipulate visual properties of the text labels by means of the user interface.

19. The method of claim 17, wherein the enabling further comprises modifying the data structure to reflect the modified visual property of the one or more text labels.

20. The method of claim 19, further comprising:
storing the modified data structure; and
restoring the modified data structure as of a particular historical point in time.

21. The method of claim 1, wherein:
the enabling comprises providing a mechanism enabling the one or more users to add or delete one or more text labels using the user interface, and to define visual properties for the one or more text labels; and
the method further comprises modifying the data structure to reflect the added or deleted text labels.

22. The method of claim 1, wherein the enabling comprises providing a mechanism allowing the one or more users to create one or more visual properties that are not already generated.

23. The method of claim 1, wherein the enabling comprises providing a mechanism allowing the one or more users to add and/or manipulate content in association with one or more of the data entities, wherein the content is selected from the group consisting of tags, notes, graphics, links to audio, links to video, and any combination thereof.

24. The method of claim 1, wherein the enabling comprises providing a mechanism allowing the one or more users to navigate the data entities and relationships by panning across and/or zooming in and out of the user interface.

25. A system for executing a computer-implemented method for displaying a data structure including data entities and relationships between the data entities, and for enabling one or more users to interact with the data structure, the system comprising one or more computer devices including or being operatively linked to:
(a) at least one display, and
(b) a user interface utility operable to:
(i) present to one or more users a user interface, by means of the at least one display;
(ii) populate the user interface with text labels representing data entities from the data structure;
(iii) enable a user to make a change to a first text label within the user interface, the user's change comprising a change to a position of the first text label from a first location on the user interface to a second location specified by the user on the user interface and one or more textual visual properties of the first text label within the user interface; and (iv) automatically determine, based on the user's change to the position and the one or more textual visual properties of the first text label, a relationship between a first data entity and a second data entity in the data structure, wherein the relationship was not represented in the data structure prior to the user's change to the first text label, wherein automatically determining the relationship comprises applying translation rules to a combination of (A) at least one positional visual property relating the position of the first text label to a position of a second text label in the user interface, and (B) at least one textual visual property of the first text label and/or the second text label, after the user's change to the first text label.

26. The system of claim 25, wherein the at least one textual visual property comprises at least one property selected from the group consisting of: size, colour, typeface, underlining, outlining, weight, and gradient.

27. The system of claim 25, wherein the first text label being the nearest larger sized text label to the second text label represents a hierarchical relationship between the first data entity and the second data entity.

28. The system of claim 25, wherein the user interface utility is operable to create a representation of a network of data entities on the user interface, and to initiate the network to be stored to a memory linked to the one or more computer devices.

29. The system of claim 28, wherein data entities stored to the memory can be retrieved as a related network.

30. The system of claim 25, wherein the system is operable to enable the one or more users, after clicking an icon presented on the user interface, to add and edit notes and graphics for a data entity.

31. The system of claim 25, wherein the user interface utility is configured to enable the user to scroll the user interface vertically or horizontally to automatically accommodate an expanding network of data entities.

32. The system of claim 25, wherein the user interface utility is configured to enable the one or more users to zoom in and zoom out of a portion of the data structure.

33. A non-transitory computer program product containing executable computer program instructions which, when executed by one or more computers having a display, perform a method for displaying a data structure including data entities and relationships between the data entities, the method comprising:

populating a user interface with text labels representing data entities from the data structure; enabling a user to make a change to a first text label within the user interface, the user's change comprising a change to a position of the first text label from a first location on the user interface to a second location specified by the user on the user interface and one or more textual visual properties of the first text label within the user interface; and automatically determining, based on the user's change to the position and the one or more textual visual properties of the first text label, a relationship between a first data entity and a second data entity in the data structure, wherein the relationship was not represented in the data structure prior to the user's change to the first text label, wherein automatically determining the relationship comprises applying translation rules to a combination of (a) at least one positional visual property relating the position of the first text label to a position of a second text label in the user interface, and (b) at least one textual visual property of the first text label and/or the second text label, after the user's change to the first text label.

34. The non-transitory computer program product of claim 33, wherein the enabling comprises allowing the one or more users, using the user interface, to create a network of data entities on the user interface, and initiate the network to be stored to a memory.

* * * * *